(12) United States Patent
Wijaya et al.

(10) Patent No.: US 8,751,334 B2
(45) Date of Patent: *Jun. 10, 2014

(54) ITEM SUBSTITUTION FOR UNAVAILABLE ITEMS RELATING TO A CUSTOMER ORDER

(75) Inventors: Joyo Wijaya, Menlo Park, CA (US); Louis H. Borders, Palo Alto, CA (US)

(73) Assignee: IpVenture, Inc., Los Altos, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 13/334,449

(22) Filed: Dec. 22, 2011

(65) Prior Publication Data
US 2012/0095879 A1   Apr. 19, 2012

Related U.S. Application Data

(63) Continuation of application No. 11/818,010, filed on Jun. 13, 2007, now Pat. No. 8,090,626, which is a continuation of application No. 09/750,385, filed on Dec. 27, 2000, now Pat. No. 7,233,914.

(51) Int. Cl.
*G06Q 30/00* (2012.01)

(52) U.S. Cl.
USPC .................... 705/26.81; 705/26.43

(58) Field of Classification Search
USPC .......................... 705/26.1–27.2, 28
See application file for complete search history.

(56) References Cited

U.S. PATENT DOCUMENTS

| | | | |
|---|---|---|---|
| 2,781,643 A | 2/1957 | Fairweather | |
| 3,406,532 A | 10/1968 | Rownd et al. | |
| 3,670,867 A | 6/1972 | Traube | |
| 3,771,679 A | 11/1973 | Thelm | |
| 4,213,310 A | 7/1980 | Buss | |
| 4,455,453 A | 6/1984 | Parasekvakos et al. | |
| 4,530,067 A | 7/1985 | Dorr | |
| 4,656,591 A | 4/1987 | Goldberg | |
| 4,792,273 A | 12/1988 | Specht | |
| 4,799,156 A | 1/1989 | Shavit et al. | |
| 4,803,348 A | 2/1989 | Lohrey et al. | |
| 4,823,984 A | 4/1989 | Ficken | |
| 4,887,208 A | 12/1989 | Schneider et al. | |
| 4,936,738 A | 6/1990 | Brennan | |
| 4,958,280 A | 9/1990 | Pauly et al. | |
| 5,027,269 A | 6/1991 | Grant et al. | |
| 5,038,283 A | 8/1991 | Caveney | |
| 5,093,794 A | 3/1992 | Howie et al. | |
| 5,101,352 A | 3/1992 | Rembert | |

(Continued)

FOREIGN PATENT DOCUMENTS

| | | |
|---|---|---|
| EP | 0 425 405 A2 | 5/1991 |
| FR | 2696722 | 4/1994 |

(Continued)

OTHER PUBLICATIONS

QuickRef Guide, QuickRefUS, Version 4.0x, U.S. Retail, 1998, 34 pgs.

(Continued)

*Primary Examiner* — William Allen

(57) ABSTRACT

A technique is disclosed for automatically implementing item substitutions for unavailable items in a customer order. According to one embodiment, line item orders from selected customer orders may be aggregated and processed for substitution analysis. Substitutions for unavailable items of selected customer orders may then be automatically implemented based upon substitution instructions, business rules, and/or other predefined criteria.

32 Claims, 8 Drawing Sheets

(56) References Cited

U.S. PATENT DOCUMENTS

| | | |
|---|---|---|
| 5,105,627 A | 4/1992 | Kurita |
| 5,113,349 A | 5/1992 | Nakamura et al. |
| 5,122,959 A | 6/1992 | Nathanson et al. |
| 5,235,819 A | 8/1993 | Bruce |
| 5,237,158 A | 8/1993 | Kern et al. |
| 5,246,332 A | 9/1993 | Bernard |
| 5,265,006 A | 11/1993 | Asthana |
| 5,272,638 A | 12/1993 | Martin et al. |
| 5,273,392 A | 12/1993 | Bernard |
| 5,322,406 A | 6/1994 | Pippin et al. |
| 5,334,824 A | 8/1994 | Martinez |
| 5,362,948 A | 11/1994 | Morimoto |
| 5,363,310 A | 11/1994 | Haj-Ali-Ahmadi et al. |
| 5,371,852 A | 12/1994 | Attanasio et al. |
| 5,395,206 A | 3/1995 | Cerny, Jr. |
| 5,402,336 A | 3/1995 | Spiegelhoff et al. |
| 5,428,546 A | 6/1995 | Shah et al. |
| 5,434,394 A | 7/1995 | Roach et al. |
| 5,444,844 A | 8/1995 | Inoue et al. |
| 5,450,317 A | 9/1995 | Lu et al. |
| 5,479,530 A | 12/1995 | Nair et al. |
| 5,533,361 A | 7/1996 | Halpern |
| 5,535,407 A | 7/1996 | Yanagawa et al. |
| 5,548,518 A | 8/1996 | Dietrich et al. |
| 5,553,312 A | 9/1996 | Gattey et al. |
| 5,568,393 A | 10/1996 | Ando et al. |
| 5,592,378 A | 1/1997 | Cameron et al. |
| 5,593,269 A | 1/1997 | Bernard |
| 5,598,487 A | 1/1997 | Hacker et al. |
| 5,615,121 A | 3/1997 | Babayev et al. |
| 5,640,002 A | 6/1997 | Ruppert et al. |
| 5,664,110 A | 9/1997 | Green et al. |
| 5,666,493 A | 9/1997 | Wojcik et al. |
| 5,687,322 A | 11/1997 | Deaton et al. |
| 5,694,551 A | 12/1997 | Doyle et al. |
| 5,708,780 A | 1/1998 | Levergood et al. |
| 5,710,887 A | 1/1998 | Chelliah et al. |
| 5,712,989 A | 1/1998 | Johnson et al. |
| 5,715,314 A | 2/1998 | Payne et al. |
| 5,758,313 A | 5/1998 | Shah et al. |
| 5,758,328 A | 5/1998 | Giovannoli |
| 5,758,329 A | 5/1998 | Wojcik et al. |
| 5,761,673 A | 6/1998 | Bookman et al. |
| 5,768,139 A | 6/1998 | Pippin et al. |
| 5,774,660 A | 6/1998 | Brendel et al. |
| 5,774,668 A | 6/1998 | Choquier et al. |
| 5,774,670 A | 6/1998 | Montulli |
| H1743 H | 8/1998 | Graves et al. |
| 5,809,479 A | 9/1998 | Martin et al. |
| 5,816,725 A | 10/1998 | Sherman et al. |
| 5,826,242 A | 10/1998 | Montulli |
| 5,826,825 A | 10/1998 | Gabriet |
| 5,831,860 A | 11/1998 | Foladare et al. |
| 5,832,457 A | 11/1998 | O'Brien et al. |
| 5,834,753 A | 11/1998 | Danielson et al. |
| 5,835,914 A | 11/1998 | Brim |
| 5,839,117 A | 11/1998 | Cameron et al. |
| 5,848,395 A | 12/1998 | Edgar et al. |
| 5,870,473 A | 2/1999 | Boesch et al. |
| 5,878,401 A | 3/1999 | Joseph |
| 5,880,443 A | 3/1999 | McDonald et al. |
| 5,884,216 A | 3/1999 | Shah et al. |
| 5,893,076 A | 4/1999 | Hafner et al. |
| 5,894,554 A | 4/1999 | Lowery et al. |
| 5,895,454 A | 4/1999 | Harrington |
| 5,897,622 A | 4/1999 | Blinn et al. |
| 5,897,629 A | 4/1999 | Shinagawa et al. |
| 5,899,088 A | 5/1999 | Purdum |
| 5,910,896 A | 6/1999 | Hahn-Carlson |
| 5,918,213 A | 6/1999 | Bernard et al. |
| 5,922,040 A | 7/1999 | Prabhakaran |
| 5,943,652 A | 8/1999 | Sisley et al. |
| 5,943,841 A | 8/1999 | Wunscher |
| 5,949,776 A | 9/1999 | Mahany et al. |
| 5,950,173 A | 9/1999 | Perkowski |
| 5,956,709 A | 9/1999 | Xue |
| 5,960,411 A | 9/1999 | Hartman et al. |
| 5,961,601 A | 10/1999 | Iyengar |
| 5,963,919 A | 10/1999 | Brinkley et al. |
| 5,974,401 A | 10/1999 | Enomoto et al. |
| 5,979,757 A | 11/1999 | Tracy et al. |
| 5,983,200 A | 11/1999 | Slotznick |
| 5,987,377 A | 11/1999 | Westerlage et al. |
| 5,991,739 A | 11/1999 | Cupps et al. |
| 5,999,914 A | 12/1999 | Blinn et al. |
| 6,003,015 A | 12/1999 | Kang et al. |
| 6,006,100 A | 12/1999 | Koenck et al. |
| 6,016,504 A | 1/2000 | Arnold et al. |
| 6,023,683 A | 2/2000 | Johnson et al. |
| 6,023,722 A | 2/2000 | Colyer |
| 6,026,378 A | 2/2000 | Onozaki |
| 6,058,417 A | 5/2000 | Hess et al. |
| 6,061,607 A | 5/2000 | Bradley et al. |
| 6,070,147 A | 5/2000 | Harms et al. |
| 6,073,108 A | 6/2000 | Peterson |
| 6,076,108 A | 6/2000 | Courts et al. |
| 6,081,789 A | 6/2000 | Purcell |
| 6,083,279 A | 7/2000 | Cuomo et al. |
| 6,084,528 A | 7/2000 | Beach et al. |
| 6,085,170 A | 7/2000 | Tsukuda |
| 6,087,952 A | 7/2000 | Prabhakaran |
| 6,088,648 A | 7/2000 | Shah et al. |
| 6,094,485 A | 7/2000 | Weinstein et al. |
| 6,094,642 A | 7/2000 | Stephenson et al. |
| 6,098,093 A | 8/2000 | Baych et al. |
| 6,098,152 A | 8/2000 | Mounes-Toussi |
| 6,101,481 A | 8/2000 | Miller |
| 6,101,486 A | 8/2000 | Roberts et al. |
| 6,115,690 A | 9/2000 | Wong |
| 6,123,259 A | 9/2000 | Ogasawara |
| 6,128,279 A | 10/2000 | O'Neil et al. |
| 6,140,922 A | 10/2000 | Kakou |
| 6,144,848 A | 11/2000 | Walsh et al. |
| 6,157,945 A | 12/2000 | Balma et al. |
| 6,167,380 A | 12/2000 | Kennedy et al. |
| 6,167,382 A | 12/2000 | Sparks et al. |
| 6,178,510 B1 | 1/2001 | O'Connor et al. |
| 6,182,053 B1 | 1/2001 | Rauber et al. |
| 6,185,479 B1 | 2/2001 | Cirrone |
| 6,185,601 B1 | 2/2001 | Wolff |
| 6,185,625 B1 | 2/2001 | Tso et al. |
| 6,215,952 B1 | 4/2001 | Yoshio et al. |
| 6,223,215 B1 | 4/2001 | Hunt et al. |
| 6,225,995 B1 | 5/2001 | Jacobs et al. |
| 6,233,543 B1 | 5/2001 | Butts et al. |
| 6,236,972 B1 | 5/2001 | Shkedy |
| 6,236,974 B1 | 5/2001 | Kolawa et al. |
| 6,249,773 B1 | 6/2001 | Allard |
| 6,249,801 B1 | 6/2001 | Zisapel et al. |
| 6,253,292 B1 | 6/2001 | Jhang et al. |
| 6,260,024 B1 | 7/2001 | Shkedy |
| 6,275,812 B1 | 8/2001 | Haq et al. |
| 6,279,001 B1 | 8/2001 | DeBettencourt et al. |
| 6,289,260 B1 | 9/2001 | Bradley et al. |
| 6,289,369 B1 | 9/2001 | Sundaresan |
| 6,289,370 B1 | 9/2001 | Panarello et al. |
| 6,292,784 B1 | 9/2001 | Martin et al. |
| 6,295,553 B1 | 9/2001 | Gilbertson et al. |
| 6,324,520 B1 | 11/2001 | Walker et al. |
| 6,332,334 B1 | 12/2001 | Faryabi |
| 6,341,269 B1 | 1/2002 | Dulaney et al. |
| 6,343,275 B1 | 1/2002 | Wong |
| 6,347,322 B1 | 2/2002 | Bogantz et al. |
| 6,351,775 B1 | 2/2002 | Yu |
| 6,360,256 B1 | 3/2002 | Lim |
| 6,369,840 B1 | 4/2002 | Barnett et al. |
| 6,374,300 B2 | 4/2002 | Masters |
| 6,385,642 B1 | 5/2002 | Chlan et al. |
| 6,397,246 B1 | 5/2002 | Wolfe |
| 6,405,173 B1 | 6/2002 | Honarvar et al. |
| 6,421,739 B1 | 7/2002 | Holiday |
| 6,424,947 B1 | 7/2002 | Tsuria et al. |
| 6,424,992 B2 | 7/2002 | Devarakonda et al. |
| 6,438,652 B1 | 8/2002 | Jordan et al. |

(56) References Cited

U.S. PATENT DOCUMENTS

| | | |
|---|---|---|
| 6,445,976 B1 | 9/2002 | Ostro |
| 6,453,306 B1 | 9/2002 | Quelene |
| 6,463,345 B1 | 10/2002 | Peachey-Kountz et al. |
| 6,463,420 B1 | 10/2002 | Guidice et al. |
| 6,466,949 B2 | 10/2002 | Yang et al. |
| 6,473,802 B2 | 10/2002 | Masters |
| 6,480,894 B1 | 11/2002 | Courts et al. |
| 6,484,150 B1 | 11/2002 | Blinn et al. |
| 6,490,567 B1 | 12/2002 | Gregory |
| 6,496,205 B1 | 12/2002 | White et al. |
| 6,505,093 B1 | 1/2003 | Thatcher et al. |
| 6,505,171 B1 | 1/2003 | Cohen et al. |
| 6,526,392 B1 | 2/2003 | Dietrich et al. |
| 6,530,518 B1 | 3/2003 | Krichilsky et al. |
| 6,535,880 B1 | 3/2003 | Muskrove et al. |
| 6,539,494 B1 | 3/2003 | Abramson et al. |
| 6,549,891 B1 | 4/2003 | Rauber et al. |
| 6,560,717 B1 | 5/2003 | Scott et al. |
| 6,567,786 B1 | 5/2003 | Bibelnieks et al. |
| 6,567,848 B1 | 5/2003 | Kusuda et al. |
| 6,571,213 B1 | 5/2003 | Altendahl et al. |
| 6,578,005 B1 | 6/2003 | Lesaint et al. |
| 6,587,827 B1 | 7/2003 | Hennig et al. |
| 6,587,866 B1 | 7/2003 | Modi et al. |
| 6,594,641 B1 | 7/2003 | Southam |
| 6,594,692 B1 | 7/2003 | Reisman |
| 6,595,342 B1 | 7/2003 | Maritzen et al. |
| 6,598,024 B1 | 7/2003 | Walker et al. |
| 6,598,027 B1 | 7/2003 | Breen, Jr. |
| 6,601,101 B1 | 7/2003 | Lee et al. |
| 6,609,159 B1 | 8/2003 | Dukach et al. |
| 6,622,127 B1 | 9/2003 | Klots et al. |
| 6,629,079 B1 | 9/2003 | Spiegel et al. |
| 6,629,135 B1 | 9/2003 | Ross, Jr. et al. |
| 6,654,726 B1 | 11/2003 | Hanzek |
| 6,671,818 B1 | 12/2003 | Mikurak |
| 6,679,425 B1 | 1/2004 | Sheppard et al. |
| 6,691,165 B1 | 2/2004 | Bruck et al. |
| 6,697,849 B1 | 2/2004 | Carlson |
| 6,697,964 B1 | 2/2004 | Dodrill et al. |
| 6,701,367 B1 | 3/2004 | Belkin |
| 6,711,618 B1 | 3/2004 | Danner et al. |
| 6,718,387 B1 | 4/2004 | Gupta et al. |
| 6,721,713 B1 | 4/2004 | Guheen et al. |
| 6,741,995 B1 | 5/2004 | Chen et al. |
| 6,748,318 B1 | 6/2004 | Jones |
| 6,748,418 B1 | 6/2004 | Yoshida et al. |
| 6,763,496 B1 | 7/2004 | Hennings et al. |
| 6,772,333 B1 | 8/2004 | Brendel et al. |
| 6,779,016 B1 | 8/2004 | Aziz et al. |
| 6,788,425 B1 | 9/2004 | Ohtsuka et al. |
| 6,792,459 B2 | 9/2004 | Elnozahy et al. |
| 6,799,165 B1 | 9/2004 | Boesjes |
| 6,801,949 B1 | 10/2004 | Bruck et al. |
| 6,826,613 B1 | 11/2004 | Wang et al. |
| 6,845,503 B1 | 1/2005 | Carlson et al. |
| 6,859,834 B1 | 2/2005 | Arora et al. |
| 6,862,572 B1 | 3/2005 | de Sylva |
| 6,865,601 B1 | 3/2005 | Cherkasova et al. |
| 6,873,970 B2 | 3/2005 | Showghi et al. |
| 6,879,965 B2 | 4/2005 | Fung et al. |
| 6,879,995 B1 | 4/2005 | Chinta et al. |
| 6,888,836 B1 | 5/2005 | Cherkasova |
| 6,901,382 B1 | 5/2005 | Richards et al. |
| 6,904,455 B1 | 6/2005 | Yen |
| 6,938,079 B1 | 8/2005 | Anderson et al. |
| 6,947,992 B1 | 9/2005 | Shachor |
| 6,957,186 B1 | 10/2005 | Guheen et al. |
| 6,970,837 B1 | 11/2005 | Walker et al. |
| 6,975,937 B1 | 12/2005 | Kantarjiev et al. |
| 6,980,962 B1 | 12/2005 | Arganbright et al. |
| 6,990,460 B2 | 1/2006 | Parkinson |
| 7,010,501 B1 | 3/2006 | Roslak et al. |
| 7,028,187 B1 | 4/2006 | Rosen |
| 7,035,914 B1 | 4/2006 | Payne et al. |
| 7,040,541 B2 | 5/2006 | Swartz et al. |
| 7,043,455 B1 | 5/2006 | Cuomo et al. |
| 7,062,556 B1 | 6/2006 | Chen et al. |
| 7,085,729 B1 | 8/2006 | Kennedy et al. |
| 7,124,101 B1 | 10/2006 | Mikurak |
| 7,139,637 B1 | 11/2006 | Waddington et al. |
| 7,139,721 B1 | 11/2006 | Borders et al. |
| 7,165,041 B1 | 1/2007 | Guheen et al. |
| 7,173,177 B1 | 2/2007 | Gould et al. |
| 7,177,825 B1 | 2/2007 | Borders et al. |
| 7,181,539 B1 | 2/2007 | Knight et al. |
| 7,197,547 B1 | 3/2007 | Miller et al. |
| 7,222,161 B2 | 5/2007 | Yen et al. |
| 7,233,914 B1 | 6/2007 | Wijaya et al. |
| 7,240,283 B1 | 7/2007 | Paila et al. |
| 7,251,612 B1 | 7/2007 | Parker et al. |
| 7,275,042 B1 | 9/2007 | Kelly et al. |
| 7,299,294 B1 | 11/2007 | Bruck et al. |
| 7,308,423 B1 | 12/2007 | Woodward et al. |
| 7,346,564 B1 | 3/2008 | Kirklin et al. |
| 7,366,755 B1 | 4/2008 | Cuomo et al. |
| 7,370,005 B1 | 5/2008 | Ham et al. |
| 7,383,233 B1 | 6/2008 | Singh et al. |
| 7,437,305 B1 | 10/2008 | Kantarjiev |
| 7,493,554 B2 | 2/2009 | Paila et al. |
| 7,509,407 B2 | 3/2009 | Miller et al. |
| 7,532,947 B2 | 5/2009 | Waddington et al. |
| 7,603,302 B1 | 10/2009 | Drummond et al. |
| 7,792,712 B2 | 9/2010 | Kantarjiev |
| 7,801,772 B2 | 9/2010 | Woodward et al. |
| 7,853,870 B2 | 12/2010 | Paila et al. |
| 7,882,501 B1 | 2/2011 | Carlson et al. |
| 7,904,975 B2 | 3/2011 | Kruglikov et al. |
| 7,930,416 B2 | 4/2011 | Miller et al. |
| 8,010,411 B2 | 8/2011 | Woodward et al. |
| 8,090,626 B1 | 1/2012 | Wijaya et al. |
| 8,140,183 B2 | 3/2012 | Waddington et al. |
| 8,170,915 B2 | 5/2012 | Borders et al. |
| 8,326,708 B2 | 12/2012 | Kantarjiev et al. |
| 8,600,821 B2 | 12/2013 | Borders et al. |
| 8,601,365 B2 | 12/2013 | Paila et al. |
| 8,626,333 B2 | 1/2014 | Waddington et al. |
| 8,635,113 B2 | 1/2014 | Borders et al. |
| 2001/0013007 A1 | 8/2001 | Tsukuda |
| 2001/0016828 A1 | 8/2001 | Philippe et al. |
| 2001/0037229 A1 | 11/2001 | Jacobs et al. |
| 2001/0042021 A1 | 11/2001 | Matsuo et al. |
| 2001/0042050 A1 | 11/2001 | Fletcher et al. |
| 2001/0047285 A1 | 11/2001 | Borders et al. |
| 2001/0047310 A1 | 11/2001 | Russell |
| 2001/0049619 A1 | 12/2001 | Powell et al. |
| 2001/0049672 A1 | 12/2001 | Moore |
| 2001/0052024 A1 | 12/2001 | Devarakonda et al. |
| 2002/0002513 A1 | 1/2002 | Chiasson |
| 2002/0004766 A1 | 1/2002 | White |
| 2002/0007299 A1 | 1/2002 | Florence |
| 2002/0010633 A1 | 1/2002 | Brotherston |
| 2002/0013950 A1 | 1/2002 | Tomsen |
| 2002/0038224 A1 | 3/2002 | Bhadra |
| 2002/0038261 A1 | 3/2002 | Kargman et al. |
| 2002/0049853 A1 | 4/2002 | Chu et al. |
| 2002/0050526 A1 | 5/2002 | Swartz et al. |
| 2002/0065700 A1 | 5/2002 | Powell et al. |
| 2002/0072994 A1 | 6/2002 | Mori et al. |
| 2002/0103724 A1 | 8/2002 | Huxter |
| 2002/0116279 A1 | 8/2002 | Nobilio |
| 2002/0188530 A1 | 12/2002 | Wojcik et al. |
| 2002/0194084 A1 | 12/2002 | Surles |
| 2002/0194087 A1 | 12/2002 | Spiegel et al. |
| 2003/0045340 A1 | 3/2003 | Roberts |
| 2003/0065565 A1 | 4/2003 | Wagner et al. |
| 2003/0079227 A1 | 4/2003 | Knowles et al. |
| 2003/0119485 A1 | 6/2003 | Ogasawara |
| 2003/0233190 A1 | 12/2003 | Jones |
| 2004/0107125 A1 | 6/2004 | Guheen et al. |
| 2004/0236635 A1 | 11/2004 | Publicover |
| 2005/0027580 A1 | 2/2005 | Crici et al. |
| 2005/0144641 A1 | 6/2005 | Lewis |
| 2005/0261985 A1 | 11/2005 | Miller et al. |

(56) References Cited

U.S. PATENT DOCUMENTS

| | | |
|---|---|---|
| 2006/0085250 A1 | 4/2006 | Kantarjiev et al. |
| 2006/0142895 A1 | 6/2006 | Waddington et al. |
| 2007/0016463 A1 | 1/2007 | Borders et al. |
| 2007/0055580 A1 | 3/2007 | Woodward et al. |
| 2007/0112647 A1 | 5/2007 | Borders et al. |
| 2007/0136149 A1 | 6/2007 | Woodward et al. |
| 2007/0162353 A1 | 7/2007 | Borders et al. |
| 2007/0174144 A1 | 7/2007 | Borders et al. |
| 2007/0250572 A1 | 10/2007 | Paila et al. |
| 2008/0015959 A1 | 1/2008 | Kruglikov et al. |
| 2008/0154709 A1 | 6/2008 | Ham et al. |
| 2009/0063439 A1 | 3/2009 | Rauser et al. |
| 2009/0094085 A1 | 4/2009 | Kantarjiev |
| 2009/0150534 A1 | 6/2009 | Miller et al. |
| 2009/0164570 A1 | 6/2009 | Paila et al. |
| 2009/0222129 A1 | 9/2009 | Waddington et al. |
| 2010/0241269 A1 | 9/2010 | Ham et al. |
| 2010/0332402 A1 | 12/2010 | Kantarjiev et al. |
| 2011/0047210 A1 | 2/2011 | Paila et al. |
| 2011/0173090 A1 | 7/2011 | Miller et al. |
| 2011/0258074 A1 | 10/2011 | Woodward et al. |
| 2012/0173449 A1 | 7/2012 | Waddington et al. |

FOREIGN PATENT DOCUMENTS

| | | |
|---|---|---|
| GB | 2 265 032 A | 9/1993 |
| WO | WO99/07121 | 2/1999 |
| WO | WO 99/09508 | 2/1999 |

OTHER PUBLICATIONS

Consumer Direct Selling Backhome Foods Products—1999: HHT Training Guide, Mar. 29, 1999.
Backhome Foods Review, est 1998.
Consumer Direct HHT Training Guide, Jun. 1998.
Alba et al., "Interactive home shopping: Consumer, retailer, and manufacturer incentives to participate in electronic marketplaces", Journal of Marketing, vol. 61, No. 3, Jul. 1, 1997, 18 pgs.
Bloch et al., "On the Road of Electronic Commerce—a Business Value Framework, Gaining Competitive Advantage and Some Research Issues", Mar. 1996, 20 pages.
Brown Janelle, "Pod People Peapod, the online grocery service, sounds great—but can it deliver?" Salon Media Group, Inc., Dec. 17, 1998, 3 pages.
Corcoran, Cathy, "The Skeptic's Guide to on-line shopping. Who has time to shop for groceries? So we gave Peapod a test run." The Patriot Ledger, Quincy, MA, Jul. 7, 1997, 4 pages.
Descartes Licenses Energy V6 Supply Chain Suite to Major Pepsi Bottler . . . News Release, Descartes Systems Group Inc., Waterloo Ontario, Aug. 27, 1998, 2 pages.
Dilger, Karen Abramic, "Warehouse Wonders", Manufacturing Systems, vol. 15, No. 2, Feb. 1, 1997, 4 pages.
Dyson et al., "Electronic Delivery without the Internet (Digital Delivery of Newspapers)", The Seybold Report on Publishing Systems, vol. 25, No. 1, ISBN: 0736-7260, Sep. 1, 1995, 9 pages.
Eckerson, Wayne, "Grocers put stock in EDI to streamline deliveries; New electronic data interchange systems offer a wealth of benefits for retailers and suppliers," Network World, Inc., Aug. 7, 1989, 2 pages.
First Stop—Main Menu, website tour, Peapod, http://web.archive.org/web/19961113150913/www.peapod.com/tour1.html, 13 pages.
Frequently Asked Questions, Peapod, http://web.archive.org/web/19961113150832/www.peapod.com/question.html, 2 pages.
"Here's How Peapod Works," http://web.archive.org/web/19961113151243/www.peapod.com/work.html, 2 pages.
"Installation and Shopping Tips for the Mac," Peapod Video, 1993, 1 page.
"Introduction to Peapod," webpages, Peapod, http://web.archive.org/web/19961113145506/www.peapod.com/intro.html, Nov. 13, 1996, 2 pages.
Ives, Blake et al., "The Information System as a Competitive Weapon", Communications of the ACM, vol. 27, No. 12, Dec. 1984. 9 pages.
Maeglin, Kathy, "Services Take the 'Shop' Out of Shopping for Groceries", The Capital Times, Mar. 20, 1997, 2 pages.
Mai et al., "Consumers' Perceptions of Specialty Foods and the Rural Mail Order Business", 52nd EAAE Seminar—Parma, Jun. 19-21, 1997, pp. 331-348.
Malone et al., "Computers, Networks, and the Corporation," Center for Information Systems Research, MIT, Aug. 1991, 14 pages.
Marsh, Barbara, "Peapod's On-Line Grocery Service Checks Out Success—Customers Shop Electronic Aisles; Finicky Workers Sack the Goods", The Wall Street Journal, Jun. 30, 1994, 2 pages.
Meeker et al., The Internet Retailing Report, U.S. Investment Research, Morgan Stanley, May 28, 1997, 241 pages.
Menzies, David, "Checking out the aisles by computer: Cori Bonina, General Manager of Stong's market in Vancouver, has made a virtual success of a meat-and-potatoes business", National Post, Dec. 1, 1998, 2 pages.
"More Information," webpages, Peapod, http://web.archive.org/web/19961113145540/www.peapod.com/more.html, Nov. 13, 1996, 2 pages.
"Online Groceries, A Quicker Shopping Cart?" E-Commerce Customers—What, Where and Why They Buy, Standard Media Inc. and Odyssey, LP, Spring 2000, 19 pages.
Patterson, Rebecca H., "No Lines at Britain's First On-Line Grocery Store, but You Still May Wait", The Wall Street Journal Europe, Jul. 25, 1997, 3 pages.
Peapod, Inc., Telephone Grocery Shopping Guide, Aug. 7, 1992, 3 introductory pages and pp. 1-12.
Podmolik, Mary Ellen, "Groceries Seeing Green From Computer Shopping", Chicago Sun-Times, May 8, 1996, 1 page.
Poirier, Charles et al., Supply Chain Optimization, Building the Strongest Total Business Network, Berrett-Koehler Publishers, San Francisco, Copyright 1996, 30 pages.
Purpura, Linda, "Getting to House from Order Smooth Transitions from Order, to Pick, to Pack, to Delivery, are a Vital Part of a Successful Home-Shopping Program", Supermarket News, Oct. 6, 1997, 2 pages.
Reynolds, Janice, "Logistics and Fulfillment for E-Business" ISBN: 1-57820074-1, 2001, 60 pages.
"Shopping—Virtually Hassle-Free", Computer Weekly, Apr. 10, 1997, 2 pages.
Smart Shopping for Busy People, Webpage, Peapod http://web.archive.org/web/19961113145048/www.peapod.com/ 1 page.
User Manual, Peapod, Inc., Version 3.10, Aug. 7, 1992, 83 pages.
U.S. Appl. No. 09/568,570, filed May 10, 2000.
U.S. Appl. No. 09/568,603, filed May 10, 2000.
U.S. Appl. No. 09/568,613, filed May 10, 2000.
U.S. Appl. No. 09/568,614, filed May 10, 2000.
U.S. Appl. No. 09/568,823, filed May 10, 2000.
U.S. Appl. No. 11/244,627, filed Oct. 5, 2005.
U.S. Appl. No. 11/191,413, filed Jul. 27, 2005.
U.S. Appl. No. 09/620,199, filed Jul. 20, 2000.
U.S. Appl. No. 09/750,385, filed Dec. 27, 2000.
U.S. Appl. No. 09/792,400, filed Feb. 22, 2001.
U.S. Appl. No. 09/813,235, filed Mar. 19, 2001.
U.S. Appl. No. 12/074,283, filed Mar. 3, 2008.
U.S. Appl. No. 11/356,870, filed Feb. 18, 2006.
U.S. Appl. No. 12/876,219, filed Sep. 10, 2010.
"Peapod Interactive Grocery Shopping and Delivery Service Now Delivers Via the Internet", Press Release, peapod.com, Apr. 22, 1996, pp. 1-2.
Anupindi et al., "Estimation of Consumer Demand with Stock-Out Based Substitution: An Application to Vending Machine Product", Marketing Science, vol. 17, No. 4, 1998, pp. 406-423.
Anon, Automatic ID News, "20/20 Results Achieved with Technology Trio", Sep. 1995, p. 19.
Chandler, Susan. "The grocery cart in your PC," Business Week, Iss. 3441, 1995, p. 63, 2 pages.
eShopper: Resources for Web Buyeing. Savetz, Kevin; Gardiner, Peace, Computer Shopper, 19, 5, 280(1), May 1999.
Dialog Search Results, re: U.S. Appl. No. 11/705,982 dated Sep. 13, 2010, pp. 1-54.

(56) References Cited

OTHER PUBLICATIONS

Fynes, Brian, et al., The Impact of Electronic Data Interchange on Competitiveness in Retail Supply Chain, IBAR vol. 14, No. 2, pp. 16-28, 1993.
Hiroo Kawata, "Information Technology of Commercial Vehicles in the Japanese Parcel Service Business," Abstract No. XP-000560489, 1992, pp. 371-382.
Hyten, Todd, "Stop & Shop mulls online grocery store", Boston Business Journal (Boston, MA, US), Mar. 22, 1996, vol. 16, No. 6, p. 1.
Jaffe, Charles A. "Gas supplier takes timing seriously if deliveries are late, the product is free," The Morning Call, Allentown, PA, Feb. 5, 1989, pp. 1-4.
Koster, Rene de, "Routing Orderpickers in a Warehouse: A Comparison Between Optimal and Heuristic Solutions," IIE Transactions, May 1998, vol. 30, No. 5, p. 469.
Maloney, David, "The New Corner Drugstore", Modern Materials Handling, May 1, 2000, vol. 55, No. 5, p. 58.
Norton, Tim R., "End-To-End Response-Time: Where to Measure?", Computer Measurement Group Conference Proceedings, CMG99 Session 423, Dec. 1999, pp. 1-9.
"Numetrix Unveils xtr@; an Internet-Designed Solution for Real-Time Supply Chain Collaboration," Business/Technology Editors, Business Wire, New York: Dec. 16, 1998, pp. 1-4.
Parker, Rachel, "UPS Pioneers a cellular data network", InfoWorld, ABI/INFORM Global, Jun. 8, 1992, p. S59-S60.
Anon, PC Foods, "Customer Service Agreement," printed from website: http://www.pcfoods.com, Abstract No. XP-002245026, 1999, pp. 1-2.
Pearce, Michael R. "From carts to clicks", Ivey Business Quarterly, Autumn 1998, vol. 63, No. 1, p. 69-71.
Sekita, Takashi, "The Physical Distribution Information Network in the Home-Delivery Business," Japan Computer Quarterly, Abstract No. XP-00.431194, 1990, pp. 23-32.
Smith et al., "Management of Multi-Item Retail Inventory Systems with Demand Substitution", Operations Research, vol. 48, No. 1, Jan.-Feb. 2000, pp. 50-64.
Fielding et al., "Hypertext Transfer Protocol—HTTP/1.1, RFC 2616", Network Working Group, Jun. 1999, pp. 1-90.
Saccomano, Ann, "'Blue Laws' Still Apply," Traffic World, Logistics Section, p. 15, Aug. 23, 1999, 2 pages.
Towie, Henry, "On the Fast Track with Totaltracks: UPS Deploys Mobile Date Service," Abstract No. XP-000560076, Document Delivery World, vol. 9, No. 3, 1993, pp. 30-31.
Van Den Berg, Jeroen P., "A Literature Survey on Planning and Control of Warehousing Systems", IIE Transactions, Aug. 1999, vol. 31, No. 3, p. 751.
Vass et al., "The World Wide Web—Everything you (n)ever wanted to know about its server", IEEE, Oct./Nov. 1998, pp. 33-37.
Wilson, Joe, "Selecting Warehouse Management Software (WMS) for Food Distribution Operations", Frozen Food Digest, Oct. 1998, vol. 14, No. 1, p. 18.
Worth Wren Jr., Fort Worth Star-Telegram Texas, "Albertson's Expects Online Grocery Shopping to Boom", KRTBN Knight-Ridder Tribune Business News (Fort Worth Star-Telegram, Texas), Nov. 9, 1998.
Wunnava et al., "Interactive Mulitmedia on the World Wide Web", IEEE, Aug. 1999, pp. 110-115.
www.peapod.com, including Introduction to Peapod; How Peapod Works; Peapod: Choosing a Delivery Time; Peapod: Sending Your Order; Retrieved from Internet Archive (web.archive.org) on Jul. 23, 2006, alleged date Nov. 13, 1996, pp. 1-9.
Hoffman, Thomas, "New UPS CIO eyes cyberdelivery," Computerworld, Nov. 11, 1996, 30, 46; ABI/INFORM Global, p. 4.
Booker, et al. "Up in the air", Computerworld, Oct. 11, 1993; 27, 41; ABI/INFORM Global, p. 54.
"Imposing an Objective Viewpoint," Modern Purchasing, vol. 36, Iss. 3, Mar. 1994, pp. 1-4.
"New Medium, new message," The Economist, vol. 329, Iss. 7834, Oct. 23, 1993, p. S 16, pp. 1-5.

Office Action for U.S. Appl. No. 09/750,385 dated Feb. 23, 2004.
Office Action for U.S. Appl. No. 09/750,385 dated Oct. 8, 2004.
Office Action for U.S. Appl. No. 09/750,385 dated May 5, 2005.
Office Action for U.S. Appl. No. 09/750,385 dated Nov. 4, 2005.
Office Action for U.S. Appl. No. 09/750,385 dated Feb. 6, 2006.
Office Action for U.S. Appl. No. 09/750,385 dated Jun. 15, 2006.
Advisory Action for U.S. Appl. No. 09/750,385 dated Sep. 1, 2006.
Notice of Allowance for U.S. Appl. No. 09/750,385 dated Feb. 27, 2007.
Office Action for U.S. Appl. No. 11/818,010, dated Jul. 15, 2010.
Notice of Allowance for U.S. Appl. No. 11/818,010, dated Oct. 21, 2010.
Notice of Allowance for U.S. Appl. No. 11/818,010, dated Mar. 31, 2011.
Notice of Allowance for U.S. Appl. No. 11/818,010, dated Aug. 26, 2011.
Coffman, Steve, "Building earth's largest library: Drive into the future," Mar. 1999, Searcher, 7, 3, 34(1).
VanMieghem, Jan A., "Peapod: Mass Customized Service", Kellogg School of Management, Northwestern University, Aug. 28, 2001 (Rev. Nov. 22, 2004), 13 pages.
Peapod's Initial Non-Infringement and Invalidity Contention under LPR 2.3, Case 1:09-cv-06870, filed Feb. 3, 2010, pp. 1-45.
Initial Non-Infringement Contentions, re: U.S. Patent No. 6,975,937, (Exhibit A), Case 1:09-cv-06870, filed Feb. 3, 2010, pp. 1-24.
Initial Non-Infringement Contentions, re: U.S. Patent No. 7,233,914, (Exhibit B), Case 1:09-cv-06870, filed Feb. 3, 2010, pp. 1-12.
Invalidity Claim Chart for U.S. Patent No. 6,975,937, (Exhibit C), Case 1:09-cv-06870, filed Feb. 3, 2010, pp. 1-30.
Invalidity Claim Chart for U.S. Patent No. 7,233,914, (Exhibit D), Case 1:09-cv-06870, filed Feb. 3, 2010, pp. 1-6.
Invalidity Claim Chart for U.S. Patent No. 7,233,914, (Exhibit E), Case 1:09-cv-06870, filed Feb. 3, 2010, pp. 1-9.
Delivery Solutions, Inc.'s and IPVenture, Inc.'s Initial Response to Peapod's LPR 2.3 Invalidity Contentions, Case 1:09-cv-06870, filed Feb. 17, 2010, pp. 1-58.
Complaint for Patent Infringement, Case 1:09-cv-06870, filed Oct. 30, 2009, pp. 1 to 5.
Answer to Complaint With Affirmative Defenses and Counterclaims, Case 1:09-cv-06870, filed Dec. 23, 2009, pp. 1-9.
BIG-IP® Controller Administrator Guide, version 3.3, © 1997-2000 F5 Networks, Inc., pp. 1-401.
BIG-IP® FireGuard™ Controller Administrator Guide, version 3.3, © 1997-2000 F5 Networks, Inc., pp. 1-168.
Bluestone Software's EJB Technology, A Technical White Paper by TechMetrix Research, Philippe Mougin, © TechMetrix 2000, pp. 1-24.
Bluestone XML-Server: First Application Server to Recognize XML™ As a Data Type, White Paper, © 1999 NC.Focus, pp. 1-21.
Load-Balancing Internet Servers, IBM International Technical Support Organization, Austin Center, Dec. 1997, © International Business Machines Corporation 1997, pp. 1-162.
Dyck, Timothy, "IBM's WebSphere 3.0 pushes ahead," PC Week, vol. 16, No. 42, Oct. 18, 1999, 4 pgs.
"IBM Provides the Power for Enterprise e-business Solutions by Launching New Phase of Server Software," News Release, Las Vegas, Jul. 20, 1999, 2 pgs.
WebSphere Application Server 3.0, Advanced Edition, Programming Documentation, pp. 1-205, *date unknown*.
WebSphere Application Server 3.0, Standard Edition, Programming Documentation, pp. 1-188, allegedly dated Oct. 1999.
WebSphere V3 Performance Tuning Guide, First Edition (Mar. 2000), © International Business Machines Corporation 2000, pp. 1-210.
IBM's Objections and Responses to Plaintiff's First Set of Interrogatories to Defendant (Nos. 1-2), Case No. 1:12-cv-00418-SAS, filed Oct. 10, 2012, pp. 1-20.
Exhibit A for IBM's Objections and Responses, Case No. 1:12-cv-00418-SAS, filed Oct. 10, 2012, pp. 1-95.
Exhibit B for IBM's Objections and Responses, Case No. 1:12-cv-00418-SAS, filed Oct. 10, 2012, pp. 1-99.
Exhibit C for IBM's Objections and Responses, Case No. 1:12-cv-00418-SAS, filed Oct. 10, 2012, pp. 1-79.

(56) References Cited

OTHER PUBLICATIONS

Exhibit D for IBM's Objections and Responses, Case No. 1:12-cv-00418-SAS, filed Oct. 10, 2012, pp. 1-67.
Exhibit E for IBM's Objections and Responses, Case No. 1:12-cv-00418-SAS, filed Oct. 10, 2012, pp. 1-97.
Exhibit F for IBM's Objections and Responses, Case No. 1:12-cv-00418-SAS, filed Oct. 10, 2012, pp. 1-120.
Exhibit G for IBM's Objections and Responses, Case No. 1:12-cv-00418-SAS, filed Oct. 10, 2012, pp. 1-53.
Exhibit H for IBM's Objections and Responses, Case No. 1:12-cv-00418-SAS, filed Oct. 10, 2012, pp. 1-65.
Deshpande, Salil. "Clustering: Transparent Replication, Load Balancing, and Failover," CustomWare, Jan. 2000, pp. 1-23.
"Enterprise JavaBeans™ Programmer's Guide," Inprise Application Server™ Version 4.0, © 1999 Inprise Corporation, pp. 1-165.

| SKU # | SKU DESCRIPTION | RANK | SUBSTITUTE RATIO | SUBSTITUTE SKU # | SUBSTITUTE SKU DESCRIPTION | RULE |
|---|---|---|---|---|---|---|
| 1001 | Budweiser 6 pack | 1 | 0.5 | 1002 | Budweiser 12 pack | Lesser Charge |
|  |  | 2 | 1 | 1005 | Budweiser 2 liter | Lesser Charge |
|  |  | 3 | 1 | 1009 | Miller 6 pack | No charge |
| 2001 | Wheaties 28 Oz. | 1 | 1 | 2002 | Natures Way Organic Wheat Flakes | Lesser Charge |
| 3001 | Lean Ground Beef | 1 | 1 | 3002 | Not so Lean Ground Beef | No charge |
| 4001 | Large Red Apples | 1 | 2 | 4003 | Medium Red Apples | Lesser Charge |
|  |  | 2 | 1 | 4007 | Large McIntosh Apples | No charge |
|  |  | X |  | 4050 | Green Apples | Not allowed |

Fig. 4

ITEM SUBSTITUTION FOR UNAVAILABLE ITEMS RELATING TO A CUSTOMER ORDER

CROSS-REFERENCE TO RELATED APPLICATIONS

This application is a continuation of U.S. patent application Ser. No. 11/818,010 (now U.S. Pat. No. 8,090,626), filed Jun. 13, 2007, and entitled "Item Substitution for Unavailable Items Relating to a Customer Order," which is incorporated herein by reference, and which is a continuation of U.S. patent application Ser. No. 09/750,385 (now U.S. Pat. No. 7,233,914), filed Dec. 27, 2000, and entitled "Technique for Implementing Item Substitution for Unavailable Items Relating to a Customer Order," which is incorporated herein by reference.

This application is related to the following patent applications: U.S. patent application Ser. No. 09/568,603 (now U.S. Pat. No. 7,177,825); U.S. patent application Ser. No. 09/568,570; and U.S. patent application Ser. No. 09/568,569 (now U.S. Pat. No. 6,622,127), all filed on May 10, 2000. Each of the above-referenced U.S. patent applications is incorporated herein by reference for all purposes.

BACKGROUND OF THE INVENTION

The present invention pertains to order substitution methods and systems that automatically perform substitutions for unavailable items in a customer order. More specifically, the invention allows for the substitution of unavailable items based upon predetermined criteria and set processes, so that the substitutions are made in a manner that optimizes efficiency and customer satisfaction.

Substitution methods in the current art typically use non-systematic and inefficient procedures in order to provide substitute items for unavailable items in a customer order. For example, some Internet-based grocery shoppers, (such as, for example, Peapod Inc., of Skokie, Ill.), send human buyers to one or more stores in order to fulfill customer orders. If a buyer is trying to fulfill an order for Brand A 64 oz. Ketchup, for example, and it is out of stock at the store, the buyer can make a substitution in order to approximate the product that the customer ordered. However, the substituted item may only be chosen from available items on the grocery shelf, which are typically adjacent to the unavailable items on the shelf space. Thus, for example, the buyer might substitute the same brand ketchup in a different size or variety, or a different brand in a similar size or variety, assuming that either is available at the store.

There are several problems with conventional order substitution methods. For one, the buyer's guess often does not result in a satisfactory substitute, particularly since they buyer is typically not an expert on all types of products. Also, the buyer does not have a procedure by which to consider all of his or her or her customer orders in the aggregate in order to make decisions that better maximize customer satisfaction. Further, no procedures exist for aggregating the orders of one buyer with that of other buyers in order to make larger aggregate decisions. Additionally, the buyer also does not have access to data concerning the available inventory of the store before attempting to fulfill his or her orders, and therefore is only able to make ad hoc decisions at the time of fulfillment.

For these, and other reasons, an efficient, automatic system architecture and method is desired to implement substitutions for unavailable items in customer orders.

SUMMARY OF THE INVENTION

This invention provides systems and methods for implementing item substitutions with respect to consumer orders in order to implement substitutions of unavailable items in customer orders. In a specific embodiment, this is accomplished by first taking customer orders via a data or computer network. A selected number of customer orders may then be aggregated and analyzed in order to make item substitution decisions. The decisions may be based upon a variety of different criteria, including one or more of the following: data from the selected customer orders, customer preferences, predefined substitution rules for each of the products, and accurate inventory information on the actual availability of products, etc.

Specific embodiments of the invention provide a method and computer program product for effecting, via a computer network, substitution of at least one ordered item of at least one customer order. At least one customer order is received via the computer network. At least a portion of the received customer order is analyzed to determine whether at least one item of inventory has been oversold. According to a specific implementation, the analyzed order data may be compared to available inventory data to determine whether at least one item of inventory has been oversold. Order line items relating to an identified oversold item may then be identified, wherein each order line item may be associated with a respective customer order. According to a specific implementation, order line items for identified oversold items may be selected using at least a portion of the predefined criteria. At least one second item may then be substituted for an identified oversold item in selected customer orders, based upon the predefined criteria. According to one implementation, the item substitution technique of the present invention may be performed by an automated computer process. It may also be performed at a time of fulfilling an order without intervention from a human operator.

According to a specific implementation, the predefined criteria may include a variety of business rules relating to how line items are selected for substitution analysis, and relating to how substitute items are selected. For example, the predefined criteria may include rules relating to minimizing a total number of order substitutions performed for each customer order; rules relating to selecting, for substitution analysis, order line items which have a relatively highest order quantity; sorted list of substitute products from which substitute items are chosen; rules for substituting a specific quantity of a second item for an unavailable item; etc.

An alternate embodiment of the present invention is directed to a system for effecting, via a computer network, substitution of at least one ordered item of at least one customer order. The system may include least one central processing unit, at least one interface configured or designed to receive at least one customer order via the computer network, and memory. The at least one customer order may include at least one order line item relating to an ordered quantity of a particular item of inventory. The memory may be configured to store customer order information and predefined criteria relating to item substitution rules. The system may be configured to analyze at least a portion of the received customer orders to determine whether at least one item of inventory has been oversold. The system may also be configured to identify order line items relating to an identified oversold item, wherein each order line item is associated with a respective customer order. The system may also be configured to substitute, based upon predefined criteria, at least one second item for the identified oversold item in selected customer orders.

Alternate embodiments of the present invention are directed to a method and computer program product for effecting, via a computer network, substitution of at least one ordered item of at least one customer order. At least one customer order is received via the computer network. Each customer order may include at least one order line item relating to an ordered quantity of a particular item of inventory. At least a portion of the received customer orders may then be analyzed to determine whether at least one item of inventory has been oversold. Order line items relating to an identified oversold item may be identified, each order line item being associated with a respective customer order. At least one second item may then be substituted for the identified oversold item in selected customer orders based upon predefined criteria.

Additional objects, features and advantages of the various aspects of the present invention will become apparent from the following description of its preferred embodiments, which description should be taken in conjunction with the accompanying drawings.

BRIEF DESCRIPTION OF THE DRAWINGS

FIG. 4 shows an example of substitution instructions for specified SKUs in accordance with a specific embodiment of the present invention.

DETAILED DESCRIPTION OF THE PREFERRED EMBODIMENTS

The following discussion presents some terms and concepts pertinent to the operation of a distribution center. The invention is not specifically limited to the examples described hereafter.

Figure 1:
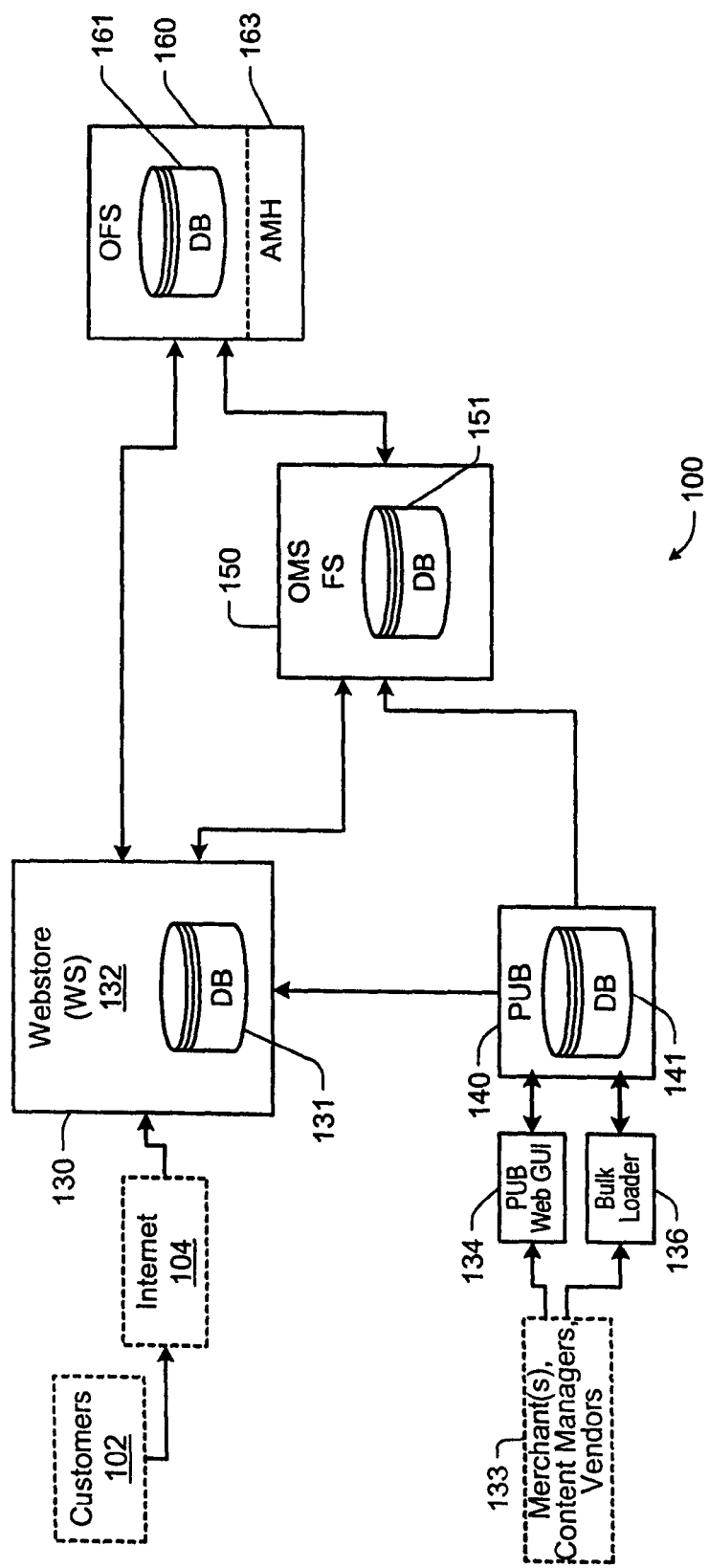
FIG. 1 shows a schematic block diagram showing the most relevant parts of integrated system architecture in accordance with a specific embodiment of the present invention.

FIG. 1 shows a schematic block diagram of a specific embodiment of an integrated system architecture 100 which may be used for implementing the automated substitution technique of the present invention. As shown in FIG. 1, system 100 includes a plurality of subsystems and other components for effecting electronic commerce over a data network. A brief description of at least a portion of the plurality of subsystems of system 100 is presented below.

For example, system 100 of FIG. 1 may include a Publishing (PUB) Subsystem 140 which provides an interface to merchants, vendors and/or content managers 133; a Webstore Subsystem (WS) 132 which manages the on-line store interface with customers, including customer shopping and ordering transactions; an Order Management Subsystem (OMS) 150 which manages pricing data, item availability data, inventory data, vendor data, finance, procurement, etc.; an Order Fulfillment Subsystem (OFS) 160 which facilitates the fulfillment of customer orders; etc. Each of the various subsystems shown in FIG. 1 of the drawings will now be described briefly below.

According to a specific implementation, the PUB Subsystem 140 may be used for managing SKU inventory and catalog information (e.g. SKUs, UPCs, products, categories, descriptive attributes, etc.), and item substitution information provided by merchants or vendors.

"Inventory" is the stock of SKU items actually available for customer orders. Each different item of inventory is associated with a respective stock keeping unit or SKU, regardless of whether the item is available for customer purchase. A "stock keeping unit" or SKU may be defined as a unique identifier that corresponds to a particular consumer item. A type of product, for example, Brand A ketchup, may have several unique SKUs, each corresponding, for example, to different sizes and/or flavors of Brand A ketchup.

Merchants and content managers 133 may enter and maintain SKU information stored in the PUB database using the PUB Web GUI interface 134 and PUB Bulk Loader interface 136. The SKU information may include SKU attribute values such as, for example, UPCs, vendors, categories, category hierarchy, images, articles, descriptive information, etc. The PUB Web GUI interface 134 allows merchants to edit SKU information, products, and/or categories. The PUB Bulk Loader 136 supports the processing of data files from outside the PUB Subsystem into the PUB database 141. According to a specific embodiment, the PUB Bulk Loader is configured to allow merchants to upload a variety of data file types into the PUB database including flat data files, and image files. The Bulk Loader processes the flat file information to create appropriate database records for the PUB catalog.

Periodically (e.g., minutes, hours, days) the OMS polls the PUB database for new and updated SKU information, and stores the retrieved data into the OMS database 151. According to a specific embodiment, OMS maintains available-to-promise (ATP), price, and inventory (e.g., replenishment and purchasing) information for each SKU. OMS may also capture and/or manage sales and shipment data relating to each SKU. Periodically, OMS passes new and updated SKU information it acquires from the PUB Subsystem to the OFS. The SKU information may be used by OFS, for example, to maintain physical inventory and fulfill orders.

According to a specific embodiment, the PUB Subsystem 140 may be used as an interface to allow merchants/vendors to enter substitution instructions relating to specific SKUs. An example of a set of substitution instructions for selected SKUs is shown in FIG. 4 of the drawings.

FIG. 4 shows an example of substitution instructions 400 for specified SKUs in accordance with a specific embodiment of the present invention. As shown in the example of FIG. 4, a set of "substitution instructions" may comprise a plurality of different fields, including, for example, a list of different SKUs 410, a description 411 of each SKU, and corresponding substitution rules 450 associated with each SKU. In the example of FIG. 4, substitution instructions are included for four SKU items, namely "Budweiser 6 pack" 402, "Wheaties 28 oz." 404, "Lean Ground Beef" 406, and "Large Red Apples" 408.

As shown in the embodiment of FIG. 4, substitution rules 450 for each original SKU 410 may include one or more substitute SKUs 417. The substitution rules 450 may also include a ranking preference 412 for each substitute SKU, a substitution ratio 416 to be applied for each respective substitute SKU, a description 418 of each substitute SKU, pricing rules 420 for each substitute SKU, etc. For example the SKU entry 402 corresponding to "Budweiser 6 pack" may be substituted with three alternate SKU items, which have been sorted according to preference, namely, (1) Budweiser 12 pack, (2) Budweiser 2 liter, and (3) Miller 6 pack. The ranking indicates an order of preference, which means that the substitution procedure will attempt to use substitute SKU (1) first, then SKU (2) if SKU (1) is not available, then SKU (3) if neither SKU (1) or SKU (2) are available.

According to a specific implementation, the "substitution rules" for particular SKU indicate how substitutions are to be performed for that SKU. The substitute ratio field 416 may be used to determine how much quantity of a substitute SKU is to be substituted for a specified quantity of an original SKU. According to a specific embodiment, it is preferable to have a substitute ratio included since a substitution may not necessarily be one for one. The "charge rule" or pricing field 420 may be used to determine a price to bill the customer for the substituted item.

For example, if a customer orders a quantity of 1 "Budweiser 6 Pack", and later it is determined that this SKU is oversold or unavailable, the substitution instructions 400 may be referenced in order to determine which products/items may be substituted for the unavailable item. According to the example of FIG. 4, a "Budweiser 12 pack" is the preferred choice for substituting for a "Budweiser 6 Pack." Using the substitution rules shown in (402), a quantity of 0.50 "Budweiser 12 pack" may be substituted for each quantity of 1 "Budweiser 6 pack" item ordered, so that approximately the same amount of actual net weight beer is substituted. However, according to a specific implementation, substitute ratios may be rounded up to the nearest whole integer so that a customer that ordered one "Budweiser 6 pack" item will receive one "Budweiser 12 pack" item and not one-half of a "Budweiser 12 pack" item. If the customer had ordered two "Budweiser 6 pack" items, the customer may still receive only one "Budweiser 12 pack" item as a substitution.

Another aspect relating substitute item processing concerns pricing for substitute items. As shown in FIG. 4, the substitution instructions may include a "charge rule" or pricing field 420, which may be used to determine a price to bill the customer for the substituted item. For example, as shown in row 402 of FIG. 4, where one item of "Budweiser 12 pack" has been substituted for one item of "Budweiser 6 pack," the pricing rule 420 specifies "lesser charge." This means that the customer will be charged the lower of the two prices of either the original SKU or the substitute SKU. Thus, in this example, assuming that the price of a "Budweiser 6 pack." item is less than the price of a "Budweiser 12 pack" item, the customer will be charged for the price of a "Budweiser 6 pack," even if an entire "Budweiser 12 pack" item is substituted for the "Budweiser 6 pack."

A different pricing rule is shown in FIG. 4 as "no charge." This means that a customer will not be charged for a substituted item. For example, as shown in FIG. 4, if the "Miller 6 pack" item is substituted for a "Budweiser 6 pack" item, the customer incurs no charge for the substituted item. Presumably, this pricing may be used as appropriate to achieve desired levels of customer satisfaction.

According to a specific embodiment, the substitution instructions may also include a "not allowed" substitution rule for one or more SKUs. This is shown, for example, in entry 408 of FIG. 4. In this example, the original SKU item is "Large Red Apples", and one of the substitute items listed is "Green Apples", which is indicated by an "X" in the "rank" field 412, indicating that "Green Apples" are not allowed to be substituted for "Large Red Apples." Thus, according to a specific implementation, while any item that is not listed in the substitution list is implicitly not allowed as a substitute SKU, an item may explicitly excluded as a possible substitute for one or more specified SKUs.

It will be appreciated that, in an alternate embodiment, the substitution instructions may be entered by merchants, vendors, or other human operators via the Webstore interface 132, or via other desired system interfaces. Further, according to a specific implementation, the merchant or vendor is able to add, rearrange, and remove items from the substitution list. Additionally, according to a specific embodiment, merchants and/or vendors may be provided with information relating to oversold items. For example, a merchant may be provided with information relating to selected oversold items for customer orders which are to be fulfilled the following day. The merchant is then able to analyze the oversold item information, and submit substitution instructions for the selected oversold items before the customer orders are fulfilled. According to one implementation, the oversold item information may be provided to a merchant via the PUB Subsystem 140.

According to at least one alternate embodiment, substitution instructions may be generated automatically using a general set of business and customer preference rules in order to save time and also optimize customer satisfaction. Preliminary substitution lists may also be generated in the same manner to be approved or edited by merchants. In any of these embodiments, the substitution instructions are typically stored in a database for retrieval at the appropriate point of use. In another embodiment, a substitution list can be dynamically generated at the time of use, again by using a general set of business and customer preference rules.

Webstore Subsystem (WS)

According to a specific implementation, the Webstore Subsystem (WS) 132 provides an interface for enabling customers to access an on-line store (e.g. Webstore), which, for example, may be used to provide a customer with an electronic representation of a retail store. In a specific embodiment where the Webstore may be implemented as a website on the World Wide Web, customers 102 may access the Webstore via the Internet 104 or World Wide Web using any one of a plurality of conventional browsers. The Webstore user interface may be designed to provide a rich set of functions without requiring any special browser plug-ins. Thus, according to a specific embodiment, customers may access the Webstore using any client machine, regardless of the machine's operating system platform. Additionally, for security purposes, the Webstore interface also supports data encryption for exchange of any sensitive or private information between the customers and the website. According to a specific embodiment, the secure Webstore interface may be implemented using a secure http protocol (HTTPS), commonly known to those of ordinary skill in the art.

In accordance with a specific embodiment, the Webstore Subsystem 132 may be configured to support a number of customer related features such as, for example, self registration; accessing of customer account information; browsing of product categories and category hierarchy; viewing of product images and product information; keyword searches; delivery scheduling; accessing of customer order history; customizable shopping lists; on-line shopping and ordering; etc.

The Webstore Subsystem (herein referred to as the Webstore) may be implemented using at least one server which is connected to the data network. According to a specific embodiment, the Webstore may be implemented using a plurality of web servers (e.g. a load-balanced web server farm) which helps to minimize server response time and provide real-time failover and redundancy capabilities. Further, according to a specific embodiment, in order to keep the web server response time to a minimum, the Webstore may be configured such that all processing is performed on a single server, within one process. Where a plurality of Webstore servers are used, redundant processing may be performed by at least a portion of the servers so that a single Webstore server may handle all Webstore processing tasks associated with a particular on-line customer. It will be appreciated that the Webstore server boundaries may be crossed where appropriate, such as, for example, when accessing desired databases via the data network.

Order Management Subsystem (OMS)

The Order Management Subsystem (OMS) 150 manages a variety of aspects related to the integrated system architecture of system 100, including, for example, pricing, availability, inventory, vendors, financials, procurement, and data flows between various subsystems.

As shown in FIG. 1, the OMS subsystem 150 includes at least one database 151 for storing various data received from at least a portion of the other subsystems. According to a specific embodiment, the database 151 is configured to include a plurality of schemas, such as, for example, standard packaged application schemas and/or customized schemas. According to a specific implementation, the OMS database is configured as a single Oracle database running on a Sun Solaris server.

According to a specific implementation, OMS batch processing may be controlled using a process scheduler. The process scheduler is able to manage the number of concurrent processes being run and the date/time at which certain processes are to run or be executed. The process scheduler may also enable central visibility of all processes currently running. Batch processing and reporting may be accomplished using a variety of different technologies commonly known to one having ordinary skill in the art.

The Order Management Subsystem may be configured to support both asynchronous and synchronous interfaces with the other subsystems. In a specific embodiment, the OMS is configured to support an asynchronous interface with each of the other subsystems. Additionally, each OMS interface is configurable, and may be configured to support the running of batch processes as often as is desirable.

Implementation of the various interfaces between OMS and the other subsystems may be accomplished using a variety of different techniques commonly known to one having ordinary skill in the art. The following description provides an example of at least some of the various techniques which may be used for interfacing OMS with the other subsystems. However, it will be appreciated that the specific interfaces described below may be implemented using other techniques commonly known to those of ordinary skill in the art.

The interface between the OMS and the Webstore Subsystem may be implemented, for example, using a plurality of executable programs. A first portion of the executable programs may be responsible for moving data from the Webstore to the OMS. This data may include, for example, new/updated customer data, new/updated order data, order cutoff information, order billing information, customer return information, customer credits and fees (e.g. bill adjustment data), etc. A second portion of the executable programs is responsible for moving data from the OMS to the Webstore Subsystem. This data may include, for example, inventory data, availability data, pricing data, and information about shipped customer orders.

Order Fulfillment Subsystem (OFS)

The Order Fulfillment Subsystem 160 manages all functionality of the distribution center (DC). In the embodiment of FIG. 1, the OFS includes appropriate hardware and/or software for managing the DC, including, for example, a warehouse management system (e.g. application software), at least one database 161, an automated material handling (AMH) controller component 163 (which manages conveyor, carousel, and scanner components), etc. In a specific implementation, the Order Fulfillment Subsystem 160 may be implemented using a warehouse management system such as, for example, the MOVE warehouse management system provided by Optum, Inc. of Costa Mesa, Calif. The warehouse system also provides an interface with the Order Management Subsystem. In a specific embodiment, this interface may be implemented using a business host interface (BHI). The warehouse management subsystem may also provide the interface for allowing the OMS subsystem to communicate with the OFS database 161.

The description is only a partial description of an architecture that is suitable for practicing the current invention, with emphasis on the subsystems that are most directly involved in the substitution procedure of the current invention. For a more complete description of such an architecture, see U.S. patent application Ser. No. 09/568,603.

It will be appreciated that other embodiments of the system of FIG. 1 may be used for implementing the technique of the present invention. For example, entire subsystems or selected features or components of the WS Subsystem 132, OMS Subsystem 150, PUB Subsystem 140, and/or OFS Subsystem 160 may be eliminated (if desired) or incorporated into other subsystems of the system of FIG. 1. Such modifications will be apparent to one having ordinary skill in the art. In a specific embodiment, it is preferable that the system 100 include at least a Webstore Subsystem (for receiving customer orders and maintaining inventory records), and an Order Fulfillment Subsystem (for fulfilling customer orders).

Figure 2:
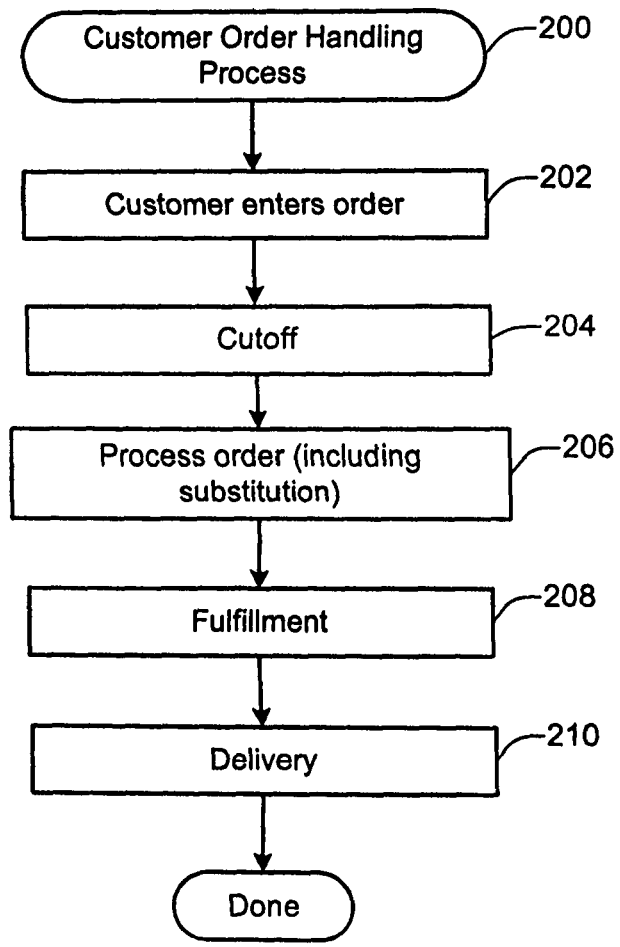
FIG. 2 shows a flow diagram of a Customer Order Handling Process in accordance with a specific embodiment of the present invention.

FIG. 2 shows a flow diagram of a Customer Order Handling Process 200 in accordance with a specific embodiment of the present invention. The Customer Order Handling Process of FIG. 2 depicts a simplified overview of the various processes by which customer orders are taken, the customer orders are processed (including substitutions), and the customer orders are fulfilled and delivered in accordance with a specific embodiment of the present invention.

At 202, a customer enters his or her customer order via the Webstore 132 interface (described above). According to a specific embodiment, a "customer order" includes a list of SKU items that have been ordered, their associated quantities, and other relevant information (e.g., payment information, delivery time information, etc.)

The customer order may include one or more "line item orders," where each line item order corresponds to a particular SKU and includes a desired quantity of the ordered SKU. According to a specific embodiment, at the time of the customer order, the customer may also specify whether substitutions are allowed for the customer order generally, or alternatively, whether substitutions are allowed with respect to each specific line item order. The customer's general substitution preferences also may be stored in the Webstore database, and may be accessed and/or modified during the current customer order.

According to a specific embodiment, during the customer ordering process, customers will be provided information relating to availability of items. For example, customers may be provided with information relating to particular items which will not be available until after the customer's specified delivery date. In this way, item substitution of customer orders may be minimized.

However, for various reasons, it is possible that ordered items may be oversold or unavailable at the time of fulfillment of the order. For example, it is possible that the quantities of inventory levels for selected SKUs that are anticipated or expected to be available by a specific date are not actually available on that date. If it is not possible to fulfill a customer order because one or more ordered items are unavailable, that order may be said to be incomplete.

Incompletes may occur for a variety of reasons, such as, for example, vendor short shipments, goods found damaged at time of fulfillment, etc. For incompletes which relate to short shelf-life SKUs, such as, for example, bread and milk, it may be preferable, from a customer perspective, to substitute items, rather than to allow the order to be delivered incomplete.

Thus it will be appreciated that, substitution capability provides an opportunity to turn a problem into an improved customer experience. For example, customers may receive larger sizes at the smaller size price, may receive premium brands at non-premium brand prices, or may receive comparable brands at no charge.

Returning to FIG. 2, at a designated time after a customer order has been placed, a "cutoff" time occurs (204), at which point the customer is no longer able to modify the order. The customer order is then sent along with other "cutoff" customer orders to be processed (206). The processing of a customer order is generally described in U.S. patent application Ser. No. 09/568,603, previously incorporated herein by reference. According to a specific embodiment, the processing of a customer order includes performing item substitution analysis, which is generally described in FIGS. 3-7 of the drawings. In one implementation, order processing may be implemented at the Webstore Subsystem 132. In alternate embodiments, the order processing may be implemented at any desired subsystem which has been configured to handle the various tasks associated with the processing of customer orders. After the customer order has been processed, the customer order is then fulfilled (208) by obtaining the appropriate items from a warehouse, distribution center, or other locations. Once the order has been fulfilled, it may then be delivered (210) to the customer.

Figure 3:
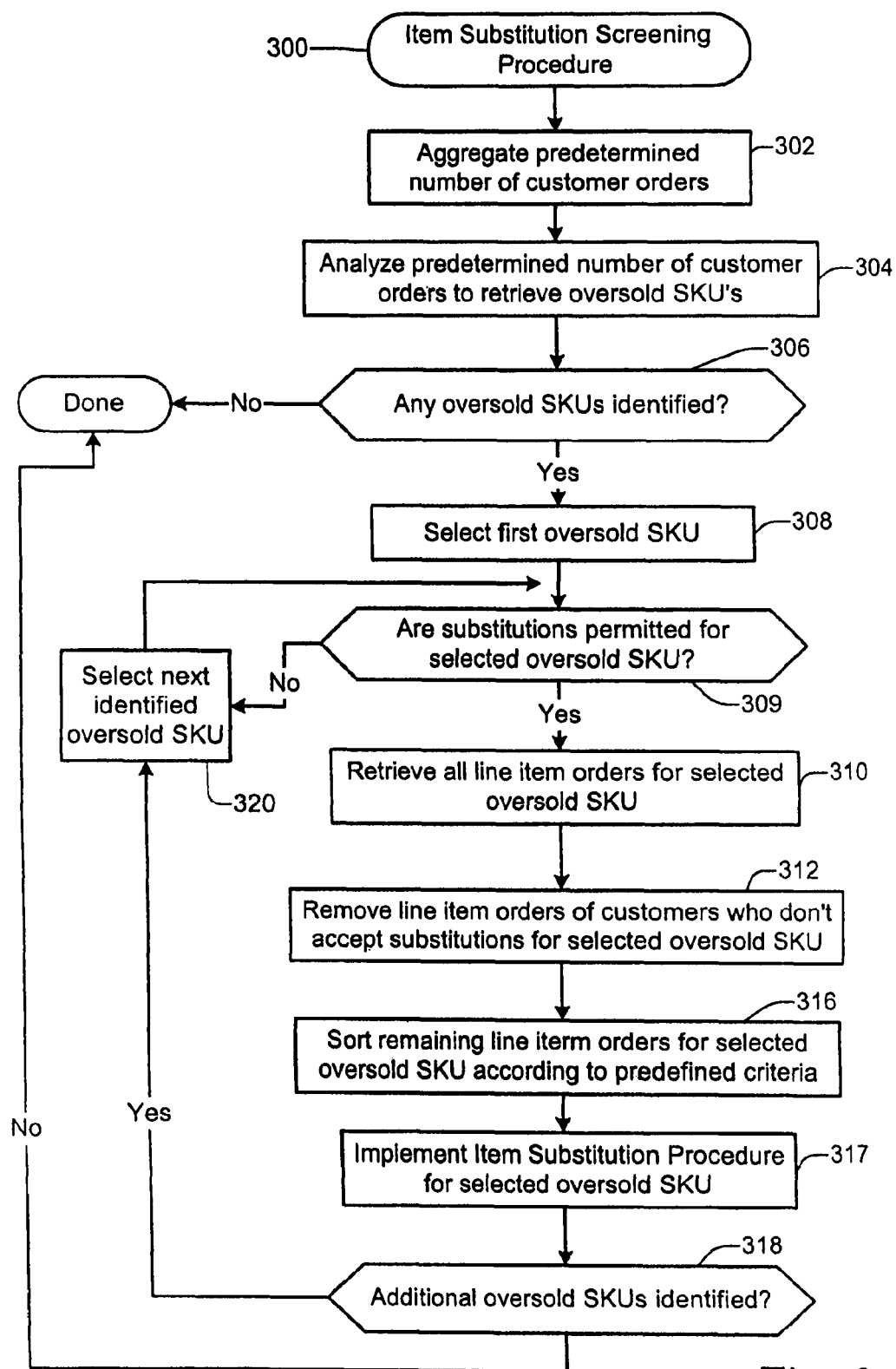
FIG. 3 shows a flow diagram of a Substitution Screening Procedure in accordance with a specific embodiment of the present invention.

FIG. 3 shows a flow diagram depicting an Item Substitution Screening Procedure (300) in accordance with a specific embodiment of the present invention. According to one embodiment, the Item Substitution Screening Procedure may be initiated during the order processing operations described, for example, at 206 of FIG. 2. According to a specific implementation, as shown, for example, in FIG. 3, the Item Substitution Screening Procedure may be configured to analyze customer orders and to generate sorted line item orders of oversold items.

In the example of FIG. 3, it is assumed that order processing has been initiated for a batch of "cutoff" customer orders. As shown at 302 of FIG. 3, all or a selected portion of the cutoff customer orders are aggregated (302) so that they may be processed collectively by the Item Substitution Screening Procedure. The selected customer orders are then analyzed (304) to determine whether any of the SKUs relating to the customer orders (herein referred to as "original SKUs") have been oversold. According to a specific embodiment, the quantity of oversold units for a particular SKU may be determined by comparing a total quantity of ordered units of that SKU (derived from the aggregated customer orders) to the quantity of available units of that SKU in the inventory. If the ordered quantity is greater than the available inventory quantity, it may be determined that the SKU has been oversold, wherein the "oversold quantity" may be represented as the difference between the ordered quantity and the available inventory quantity.

According to a specific embodiment, the quantity of available SKU units may be represented as a quantity of SKU units which are estimated to be available as of a specified date, such as, for example, the customer delivery date. According to a specific implementation, each of the customer orders in a given batch of cutoff customer orders will have the same delivery date.

Further, according to a specific embodiment, only SKUs that have associated "substitution instructions" will be analyzed for substitution analysis. As described previously, the system of the present invention may include a respective set of substitution instructions for each or selected SKUs in the inventory. These instructions may either be statically generated (e.g. created by a human operator) or dynamically generated (e.g. created by a computer system using predetermined business rules). An example of a set of substitution instructions for selected SKUs is shown in FIG. 4 of the drawings (described previously).

At 306, a determination is made as to whether there are any oversold SKUs identified. If at least one oversold SKU has been identified, then a first oversold SKU is selected (308) for substitution analysis. A determination is then made (309) as to whether substitutions are permitted for the selected oversold SKU. For example, if there are no substitution instructions for the selected oversold SKU, or if there are no substitute SKUs listed in the substitution instructions for the selected oversold SKU, then, according to at least one embodiment, substitutions are not permitted for the oversold SKU. Alternatively, the substitution instructions may specify that substitutions are not permitted for the oversold SKU. This may occur, for example, with respect to restricted SKU items such as alcohol or tobacco products.

If it is determined that substitutions are not permitted for the selected oversold SKU, then a next identified oversold SKU is selected (320) for substitution analysis. Assuming, however, that substitutions are permitted for the selected oversold SKU, line item orders (from the batch of cutoff customer orders) which correspond to the selected oversold SKU are then retrieved (310). According to a specific implementation, retrieved line item orders which correspond to customers who have requested not to received substitutions (either for the selected oversold SKU or generally) may be discarded (312) so that these line item orders are not considered for further substitution analysis. The remaining line item orders may then continue to be processed (314) for substitution analysis. The remaining line item orders may then be sorted (316) according to predefined criteria.

According to a specific embodiment, the predefined criteria may include business rules which define substitution preferences. Some of these business rules include the substitution instructions described previously with respect to FIG. 4. Other business rules may define substitution preferences based on other criteria, such as, for example: move line item orders that correspond to customer orders which already have at least one substituted item to the bottom of the list (thereby reducing the possibility of having multiple substitutions in a single customer order), substitute higher quantity line item orders first (thereby helping to reduce the total number of customer orders which include substituted items), and other rules designed to maximize customer satisfaction.

Additionally, according to a specific implementation, business rules may be included which prevent an oversold SKU and the substitute SKU from having different regulation codes (e.g. alcohol, tobacco, etc.). Additionally, business rules may be included which do not attempt to substitute a particular SKU for an oversold SKU if it is determined that the substitute SKU already exists as a line item in the customer order. Such business rules may be applied, for example, during substitute SKU selection as described, for example, with respect to FIG. 5 of the drawings.

Once the selected line item orders have been sorted, an Item Substitution Procedure (such as that shown, for example, in FIG. 5 of the drawings) may then be implemented (317) in order to perform the actual substitution for the selected oversold SKU. After the desired substitutions have been performed for the selected oversold SKU, a determination is then made (318) as to whether there are any additional oversold SKUs to be analyzed for substitution. If so, the Item Substitution Screening Procedure may then select (320) a next identified oversold SKU for substitution processing.

Figure 5:
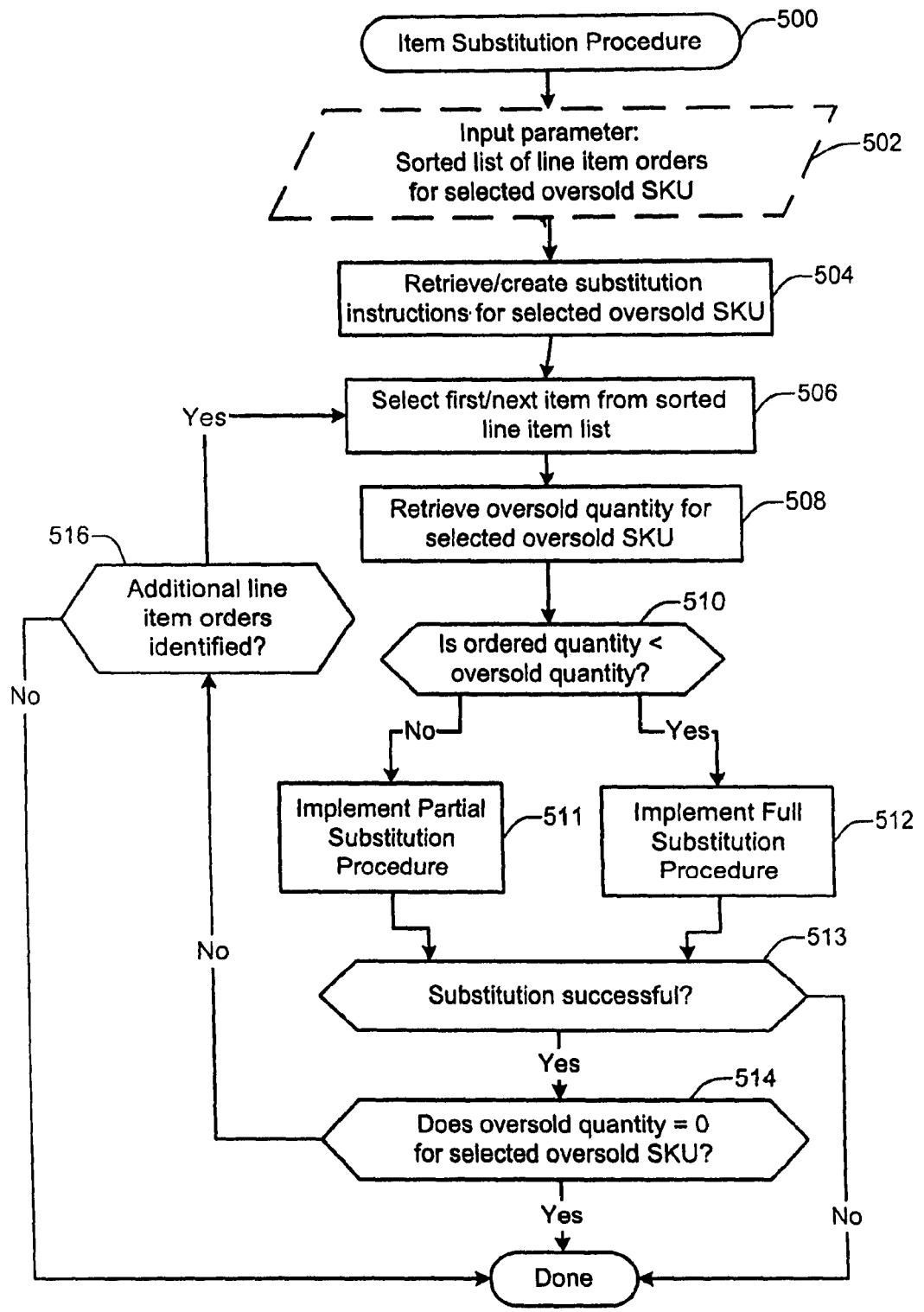
FIG. 5 shows a flow diagram depicting an Item Substitution Procedure in accordance with a specific embodiment of the present invention.

FIG. 5 shows a flow diagram depicting an Item Substitution Procedure 500 in accordance with a specific embodiment of the present invention. According to a specific embodiment, the Item Substitution Procedure (500) may be used to implement SKU substitutions for selected oversold SKUs.

Initially, as shown in the embodiment of FIG. 5, the Item Substitution Procedure may receive (502) one or more input parameters. In the example of FIG. 5, the input parameters include a sorted list of line item orders for a selected oversold SKU, which may be generated, for example, during the Item Substitution Screening Procedure of FIG. 3.

Assuming that the selected oversold SKU has been identified, the Item Substitution Procedure may then retrieve (504) the substitution instructions and other business rules (if any) relating to the identified oversold SKU. Alternatively, according to an alternate embodiment, the substitution instructions may be dynamically generated using predefined business rules specifically configured for generating substitution instructions or rules relating to specific SKUs or classes of SKUs.

As shown at 506 of FIG. 5, a first line item order from the line item list is selected (506) for item substitution analysis. The current oversold quantity for the identified oversold SKU is also retrieved (508). As described in greater detail below, the current quantity of the identified oversold SKU may periodically be updated during the Item Substitution Procedure as orders for the oversold SKU are replaced by substitute SKUs.

As shown at 508, the current oversold quantity is then compared (510) to the ordered quantity specified in the selected line item order. If it is determined that the ordered quantity is less than or equal to the current oversold quantity then a Full Substitution Procedure (such as that described, for example, in FIG. 6 of the drawings) may be implemented (511) for the selected line item order. If it is determined that the ordered quantity is greater than the current oversold quantity, then a Partial Substitution Procedure (such as that described, for example, in FIG. 7 of the drawings) may be implemented (512) for the selected line item order.

For example, if the current line item order specifies a quantity of 3 Large Red Apples, and the current oversold quantity of Large Red Apples is 4, then a full substitution procedure may be implemented, meaning that the full quantity of the line item order (e.g. 3) may be substituted. Once the substitution has been performed for the selected line item order, the current oversold quantity will be updated to 1 oversold large red apple. Alternatively, if the current line item order specifies a quantity of 3 Large Red Apples, and the current oversold quantity of Large Red Apples is 2, then a partial substitution procedure may be implemented, meaning that only a portion the line item order is to be substituted. In this example, the line item order may be filled by allocating 1 large red apple to the customer order, and substituting 2 Large Red Apples with other items.

After the appropriate substitution procedure has been be implemented for the selected line item order, a determination is then made (513) as to whether the substitution for the selected line item order was successful. If it is determined that the substitution was not successful, then, according to one embodiment, it may be assumed that no substitutions are available for the selected oversold product. Accordingly, the Item Substitution Procedure may end without attempting to perform any further substitutions for the selected oversold SKU.

Assuming, however, that the substitution for the selected line item order was successful, a determination is then made (514) as to whether the current oversold quantity for the identified oversold SKU is equal to zero. If it is determined that the current oversold quantity for the identified oversold SKU is equal to zero, then no further substitutions need be performed for the identified oversold SKU. If, however, the current oversold quantity for the identified oversold SKU is greater than zero, a determination may be made (516) as to whether there are additional line item orders (from the sorted list of line item orders) to be analyzed for item substitution analysis. If so, then a next line item order from the list is selected (506) for item substitution analysis.

Figure 6:
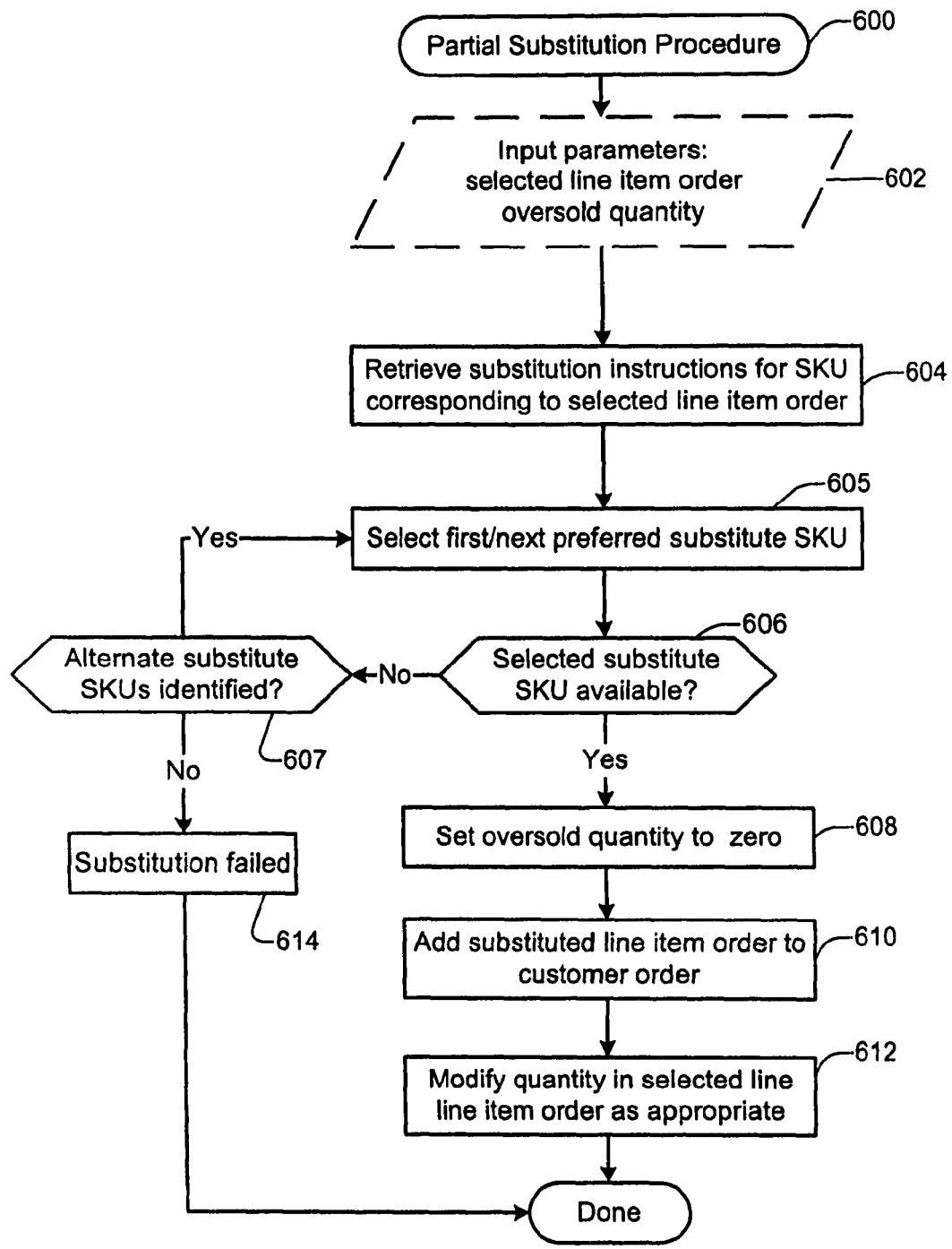
FIG. 6 shows a flow diagram depicting a Partial Substitution Procedure in accordance with a specific embodiment of the present invention.

FIG. 6 shows a flow diagram depicting a Partial Substitution Procedure 600 in accordance with a specific embodiment of the present invention. According to one embodiment, the Partial Substitution Procedure (600) may be implemented for a specified line item order in order to substitute a portion of the ordered quantity of the oversold SKU associated with that particular line item order.

Initially, as shown in the embodiment of FIG. 6, the Partial Substitution Procedure may receive (602) one or more input parameters. In the example of FIG. 6, the input parameters include a selected line item order for a selected oversold SKU, and an oversold quantity for the selected oversold SKU.

Once the selected oversold SKU has been identified, substitution instructions relating to the identified oversold SKU are retrieved (604) and processed in order to select (605) a first preferred substitute SKU for the identified oversold SKU. An example of substitution instructions is shown in FIG. 4 of the drawings.

At 606 a determination is made as to whether there is a sufficient available quantity of the selected substitute SKU to be substituted for the identified oversold SKU. If it is determined that there is an insufficient quantity of the selected substitute SKU available, then the substitution instructions may be consulted to determine (607) whether any alternate substitute SKUs are specified for the identified oversold SKU. Assuming that at least one alternate substitute SKU is specified, a next preferred substitute SKU is selected (605) for analysis. If it is determined that none of the substitute SKU(s) specified in the substitution instructions are available to be substituted for the identified oversold SKU, then, according to a specific implementation, the substitution may be reported (614) as being unsuccessful, and no substitution will be made for the identified oversold SKU.

Assuming that sufficient quantities of a selected substitute SKU are available to be substituted for the identified the oversold SKU quantity, then the partial substitution may be performed, for example, by adding (610) a "substitute line item order" to the customer order, specifying the substitute SKU and substituted quantity, and by reducing or modifying (612) the quantity in the selected line item of the customer order (corresponding to the identified oversold SKU) as appropriate. Additionally, the oversold quantity may be set (608) to zero, thereby indicating that the identified oversold SKU is no longer oversold.

For purposes of illustration, an example of the Partial Substitution Procedure will now be described using the substitution instructions illustrated in FIG. 4 of the drawings. In this example, it is assumed that the selected line item order specifies a quantity of 3 Large Red Apples, and that the current oversold quantity of Large Red Apples is equal to 2. Using the substitution list entry 408 of FIG. 4, a first preferred substitute item for "Large Red Apples" (SKU#4001) is "Medium Red Apples" (SKU#4003). Thus, the Partial Substitution Procedure will first check to see if there is a sufficient quantity of Medium Red Apples available to be substituted for the Large Red Apples. In this example, since the oversold quantity of Large Red Apples is equal to 2, only 2 of the 3 ordered Large Red Apples (of the customer's line item order) need be substituted. This may be referred to as a "partial substitution." Additionally, as shown in FIG. 4, the substitute ratio of Medium Red Apples to Large Red Apples is 2:1, meaning that a total of four (4) Medium Red Apples will be required as a substitution for 2 Large Red Apples. Accordingly, the Partial Substitution Procedure checks to see whether 4 Medium Red Apples are available to be allocated.

If it is determined that 4 Medium Red Apples are available, a new line item specifying 4 Medium Red Apples will be added to the customer order (associated with the selected line item order). According to a specific embodiment, the new line item may be described as a partial substitution for the line item order of 3 Large Red Apples. Additionally, the quantity of the customer's (original) line item order for 3 Large Red Apples will be reduced to 1 Large Red Apples, and the quantity of oversold Large Red Apples will be reduced to zero.

Alternatively, if it is determined that no Medium Red Apples are available, a next preferred substitute SKU is selected (if available) for analysis. In the example of FIG. 4, the next preferred substitute item for Large Red Apples is Large McIntosh Apples (SKU#4007). Accordingly, the Partial Substitution Procedure will check to see whether 2 Large McIntosh Apples are available to be allocated to the identified customer order. If so, then the 2 Large McIntosh Apples will be substituted for 2 of the 3 Large Red Apples ordered in the identified customer order, thereby resulting in a partial substitution.

Figure 7:
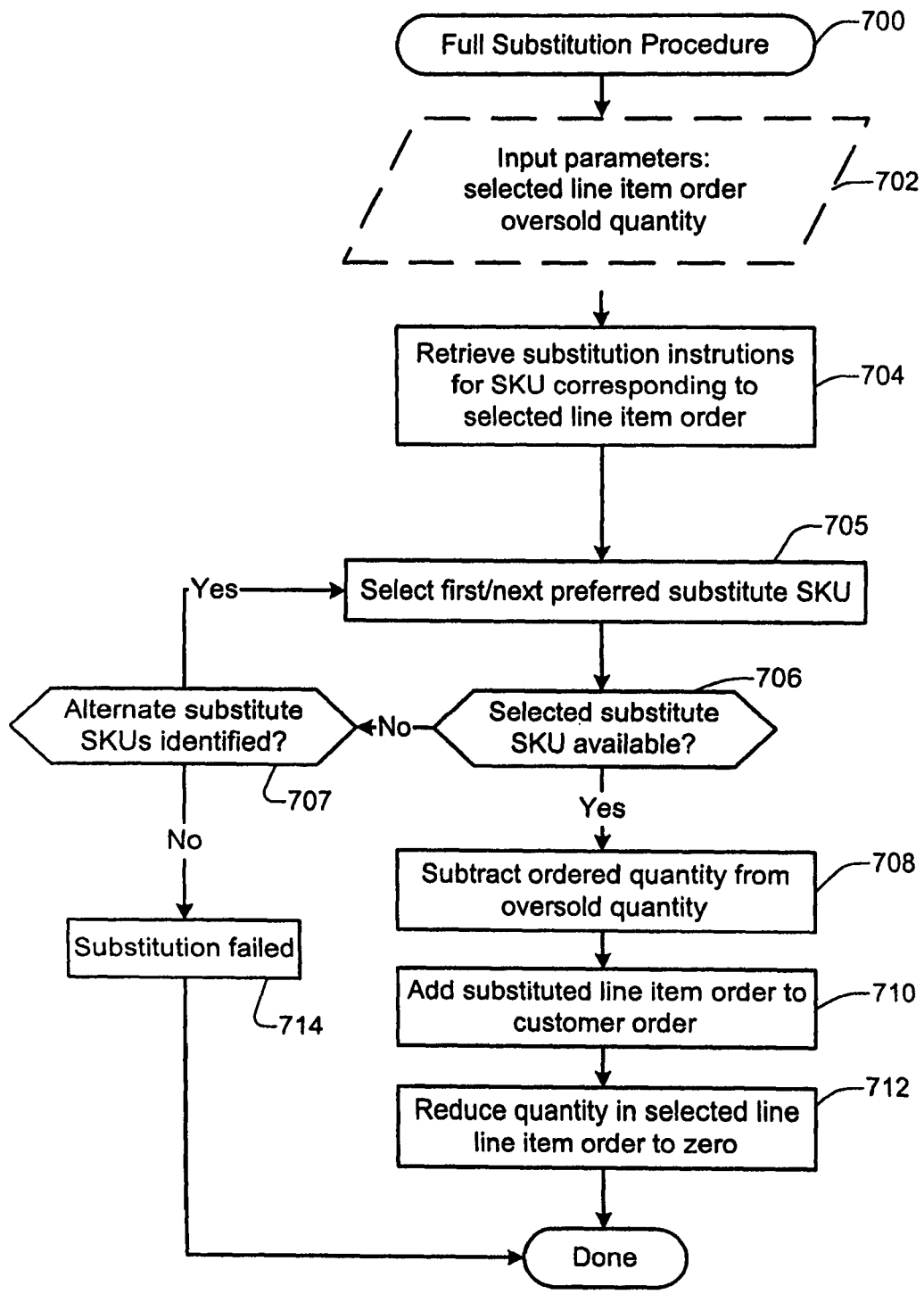
FIG. 7 shows a flow diagram depicting a Full Substitution Procedure in accordance with a specific embodiment of the present invention.

FIG. 7 shows a flow diagram depicting a Full Substitution Procedure 700 in accordance with a specific embodiment of the present invention. According to one embodiment, the Full Substitution Procedure (700) may be implemented for a specified line item order in order to substitute the ordered quantity of the oversold SKU associated with that particular line item order.

Initially, as shown in the embodiment of FIG. 7, the Full Substitution Procedure may receive (702) one or more input parameters. In the example of FIG. 7, the input parameters include a selected line item order for a selected oversold SKU, and an oversold quantity for the selected oversold SKU.

Once the selected oversold SKU has been identified, substitution instructions relating to the identified oversold SKU are retrieved (704) and processed in order to select (705) a first preferred substitute SKU for the identified oversold SKU. An example of substitution instructions is shown in FIG. 4 of the drawings.

At 706 a determination is made as to whether there is a sufficient available quantity of the selected substitute SKU to be substituted for the identified oversold SKU. If it is determined that there is an insufficient quantity of the selected substitute SKU available, then the substitution instructions may be consulted to determine (707) whether any alternate substitute SKUs are specified for the identified oversold SKU. Assuming that at least one alternate substitute SKU is specified, a next preferred substitute SKU is selected (705) for analysis. If it is determined that none of the substitute SKU(s) specified in the substitution instructions are available to be substituted for the identified oversold SKU, then, according to a specific implementation, the substitution may be reported (714) as being unsuccessful, and no substitution will be made for the identified oversold SKU.

Assuming that sufficient quantities of a selected substitute SKU are available to be substituted for the identified the oversold SKU quantity, then the full substitution may be performed, for example, by adding (710) a "substitute line item order" to the customer order, specifying the substitute SKU and substituted quantity, and by reducing or modifying (712) the quantity in the selected line item of the customer order (corresponding to the identified oversold SKU) to zero. In an alternate embodiment, the original line item order may be dropped from the customer order. Additionally, as shown in FIG. 7, the oversold quantity may be modified (708) or adjusted to reflect a new value which takes into account the number of oversold SKU items being substituted in the currently selected line item order.

For purposes of illustration, an example of the Full Substitution Procedure will now be described using the substitution instructions illustrated in FIG. 4 of the drawings. In this example, it is assumed that the selected line item order specifies a quantity of 3 Large Red Apples, and that the current oversold quantity of Large Red Apples is equal to 5. Using the substitution list entry 408 of FIG. 4, a first preferred substitute item for "Large Red Apples" (SKU#4001) is "Medium Red Apples" (SKU#4003). Thus, the Full Substitution Procedure will first check to see if there is a sufficient quantity of Medium Red Apples available to be substituted for the Large Red Apples. In this example, since the quantity of the selected line item order for Large Red Apples is equal to 3, a total of six (6) Medium Red Apples will be required as a substitution for 3 Large Red Apples. Accordingly, the Full Substitution Procedure checks to see whether 6 Medium Red Apples are available to be allocated.

If it is determined that 6 Medium Red Apples are available, a new line item specifying 6 Medium Red Apples will be added to the customer order (associated with the selected line item order). According to a specific embodiment, the new line item may be described as a full substitution for the line item order of 3 Large Red Apples. Additionally, the quantity of the customer's (original) line item order for 3 Large Red Apples will be reduced to zero Large Red Apples. Further the quantity of oversold Large Red Apples will be reduced by 3, making the new (or current) oversold quantity of Large Red Apples equal to 2.

The substitution technique of the present invention offers many advantages and capabilities over the conventional techniques. For example, technique of the present invention may be used to minimize the total number of substitutions to be implemented for a selected batch of customer orders by first implementing substitutions for line item orders of higher quantities. In addition, technique of the present invention may automatically prioritize line item orders so that customer orders that have already had at least one item substitution performed are less likely to have another item substitution performed. It will be appreciated that either of the above-described features may result in improved customer satisfaction.

Additionally, according to at least one embodiment of the present invention, substitution of ordered customer items may be automatically implemented without involving human decisions and/or human interactions at the time of fulfillment of the customer order(s). In this way, the technique of the present invention may be used to expedite order processing and order fulfillment, for example, by eliminating delays associated with human decisions and/or interactions.

Moreover, the technique of the present invention is highly scalable, and provides for more consistent and reliable substitutions as compared to conventional techniques. This, in turn, may result in improved overall quality control.

Other Embodiments

Generally, the item substitution technique of the present invention may be implemented on software and/or hardware. For example, it can be implemented in an operating system kernel, in a separate user process, in a library package bound into network applications, on a specially constructed machine, or on a network interface card. In a specific embodiment of this invention, the technique of the present invention is implemented in software such as an operating system or in an application running on an operating system.

A software or software/hardware hybrid implementation of the item substitution technique of this invention may be implemented on a general-purpose programmable machine selectively activated or reconfigured by a computer program stored in memory. Such programmable machine may be a network device designed to handle network traffic, such as, for example, a router or a switch. Such network devices may have multiple network interfaces including frame relay and ISDN interfaces, for example. A general architecture for some of these machines will appear from the description given below. In an alternative embodiment, the item substitution technique of this invention may be implemented on a general-purpose network host machine such as a personal computer or workstation. Further, the invention may be at least partially implemented on a card (e.g., an interface card) for a network device or a general-purpose computing device.

Figure 8:
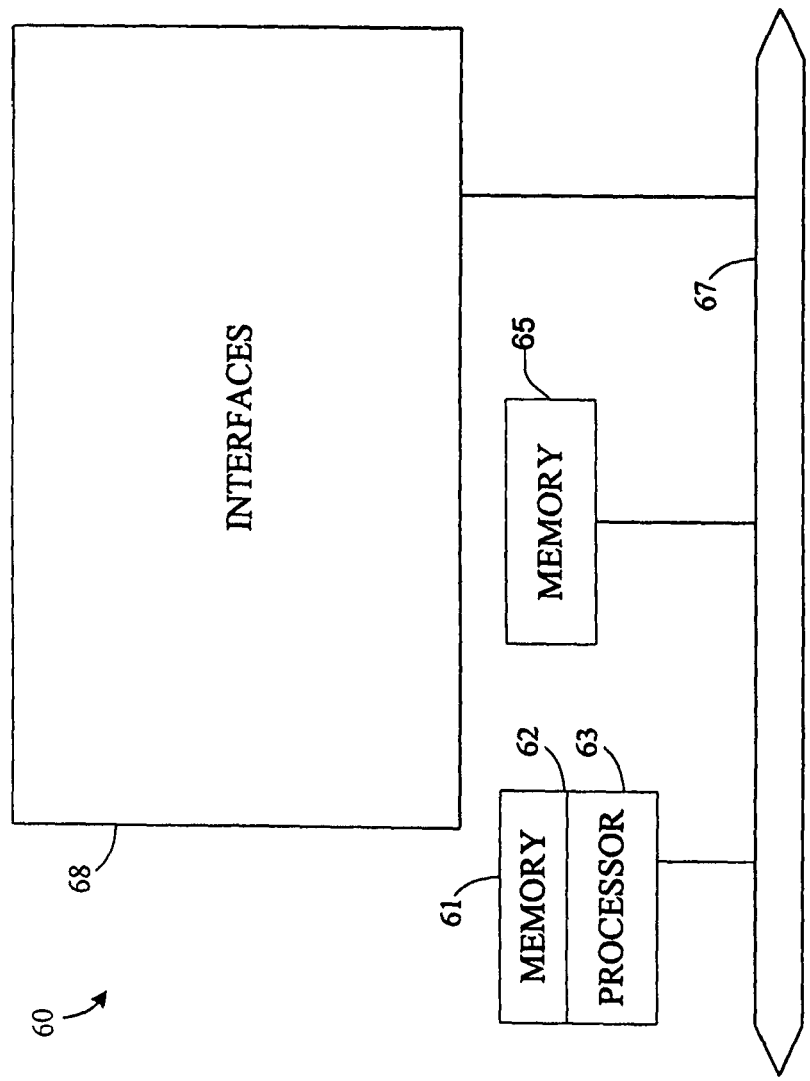
FIG. 8 is schematic illustration of hardware that is suitable for implementing the technique of the present invention.

Referring now to FIG. 8, a network device 60 suitable for implementing the item substitution technique of the present invention includes a master central processing unit (CPU) 62, interfaces 68, and a bus 67 (e.g., a PCI bus). When acting under the control of appropriate software or firmware, the CPU 62 may be responsible for implementing specific functions associated with the functions of a desired network device. For example, when configured as a load balancing device, the CPU 62 may be responsible for analyzing packets, encapsulating packets, forwarding packets to appropriate network devices, performing content and/or format verification of data, etc. The CPU 62 preferably accomplishes all these functions under the control of software including an operating system (e.g. Windows NT), and any appropriate applications software.

CPU 62 may include one or more processors 63 such as a processor from the Motorola family of microprocessors or the MIPS family of microprocessors. In an alternative embodiment, processor 63 is specially designed hardware for controlling the operations of network device 60. In a specific embodiment, a memory 61 (such as non-volatile RAM and/or ROM) also forms part of CPU 62. However, there are many different ways in which memory could be coupled to the system. Memory block 61 may be used for a variety of purposes such as, for example, caching and/or storing data, programming instructions, etc.

The interfaces 68 are typically provided as interface cards (sometimes referred to as "line cards"). Generally, they control the sending and receiving of data packets over the network and sometimes support other peripherals used with the network device 60. Among the interfaces that may be provided are Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 62 to efficiently perform routing computations, network diagnostics, security functions, etc.

Although the system shown in FIG. 8 illustrates one specific network device of the present invention, it is by no means the only network device architecture on which the present invention can be implemented. For example, an architecture having a single processor that handles communications as well as routing computations, etc. is often used. Further, other types of interfaces and media could also be used with the network device.

Regardless of network device's configuration, it may employ one or more memories or memory modules (such as, for example, memory block 65) configured to store data, program instructions for the general-purpose network operations and/or other information relating to the functionality of the item substitution technique described herein. The program instructions may control the operation of an operating system and/or one or more applications, for example. The memory or memories may also be configured to include data structures which store customer order information, inventory data, item substitution instructions, substitution business rules, etc.

Because such information and program instructions may be employed to implement the systems/methods described herein, the present invention relates to machine readable media that include program instructions, state information, etc. for performing various operations described herein. Examples of machine-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). The invention may also be embodied in a carrier wave traveling over an appropriate medium such as airwaves, optical lines, electric lines, etc. Examples of program instructions include both machine code, such as produced by a compiler, and files containing higher level code that may be executed by the computer using an interpreter.

Although certain preferred embodiments of this invention have been described in detail herein with reference to the accompanying drawings, it is to be understood that the invention is not limited to these precise embodiments, and at various changes and modifications may be effected therein by one skilled in the art without departing from the scope of spirit of the invention as defined in the appended claims.

What is claimed is:

1. A computer-implemented method for effecting, via a computer network, substitution of at least one ordered item of at least one customer order at an online store, the method comprising:

receiving, via the computer network, a plurality of customer orders placed by a plurality of customers;

analyzing, by executing instructions via at least one computing device, the plurality of customer orders to identify an item in the orders having been oversold, before delivering items in the orders to the plurality of customers; and substituting the oversold item with a substituted item for a customer order based on at least one substitution rule retrieved from a storage device, the storage device being accessible by the at least one computing device, wherein said substituting selects, from a plurality of customer orders that include the oversold item, at least one customer order that asks for the largest quantity of the oversold item so that the number of orders requiring substitution for the oversold item can be reduced.

2. A computer-implemented method as recited in claim 1, wherein the at least one substitution rule is configured to minimize the number of items to be substituted for a customer order.

3. A computer-implemented method as recited in claim 1, wherein the at least one substitution rule restricts substituting an item in a customer order if the customer so specifies when the customer places the customer order.

4. A computer-implemented method as recited in claim 1, wherein the at least one substitution rule restricts substituting all items in a customer order if the customer so specifies when the customer places the customer order.

5. A computer-implemented method as recited in claim 1, wherein the at least one substitution rule restricts substituting an oversold item if the oversold item is a regulated product.

6. A computer-implemented method as recited in claim 1, wherein the at least one substitution rule restricts substituting an oversold item by a substituted item having a different regulation code.

7. A computer-implemented method as recited in claim 1, wherein the at least one substitution restricts substituting an oversold item in a customer order by a substituted item if the customer order already includes the substituted item.

8. A computer-implemented method as recited in claim 1, wherein the price of the oversold item is lower than the price of the substituted item, and
wherein the customer paying for the customer order is charged the price of the oversold item, which is lower than the price of the substituted item.

9. A computer-implemented method as recited in claim 1, wherein the size of the oversold item is smaller than the size of the substituted item.

10. A computer-implemented method as recited in claim 1, wherein the oversold item is a non-premium brand, but the substituted item is a premium brand.

11. A computer-implemented method as recited in claim 1, wherein the oversold item is identified to be substituted in view of its shelf-life being shorter than a plurality of other items that customers can order via the online store.

12. A computer-implemented method as recited in claim 1, wherein the cost incurred by the customer for the substituted item is not greater than the cost otherwise would have been for the oversold item.

13. A computer-implemented method as recited in claim 1, wherein of the quantity of oversold item ordered by a customer, a portion of them is substituted by the substituted item, and the remaining portion is filled by the oversold item.

14. A computer-implemented method as recited in claim 1, further comprising allowing a merchant to enter information regarding at least one item via a publishing system,
wherein at least one customer of the online store is allowed to access the information from the online store regarding the at least one item,
wherein the at least one item from the merchant has become an oversold item, and
wherein the online store notifies the merchant that the at least one item from the merchant has become an oversold item.

15. A computer-implemented method as recited in claim 14, wherein the online store allows the merchant to provide a solution regarding the at least one item becoming an oversold item before the online store fulfills a customer order asking for the at least one item.

16. A computer-implemented method as recited in claim 15, wherein the merchant determines an item to substitute for the at least one item, which the online store follows.

17. A computer-implemented method as recited in claim 1, wherein a plurality of optional substituted items are identified to be the substituted item, and
wherein the plurality of optional substituted items are ranked for substitution.

18. A computer-implemented method as recited in claim 1, wherein said substituting depends on a preference specified by the customer of the at least one customer order.

19. A computer-implemented method for effecting, via a computer network, substitution of at least one ordered item of at least one customer order at an online store, the method comprising:
receiving, via the computer network, a plurality of customer orders placed by a plurality of customers;
analyzing, by executing instructions via at least one computing device, the plurality of customer orders to identify an item in the orders having been oversold, before delivering items in the orders to the plurality of customers; and
substituting the oversold item with a substituted item for a customer order based on at least one substitution rule from a storage device, the storage device being accessible by the at least one computing device,
wherein the at least one substitution rule is configured to minimize the number of items to be substituted for a customer order.

20. A computer-implemented method as recited in claim 19, wherein said substituting depends on a preference specified by the customer of the customer order.

21. A computer-implemented method for effecting, via a computer network, substitution of at least one ordered item of at least one customer order at an online store, the method comprising:
receiving, via the computer network, a customer order placed by a customer;
analyzing, by executing instructions via at least one processor, the customer order with at least one other customer order to identify an item in the customer orders having been oversold, before delivering items in the orders to the customers;
notifying the merchant that provides the oversold item to the online store that the item has become oversold; and
allowing the merchant to provide at least a part of a solution regarding the item becoming an oversold item before the online store fulfills a customer order asking for the item,
wherein at least a part of the solution is configured to be stored in a storage device, which is accessible by the at least one processor.

22. A computer-implemented method as recited in claim 21, wherein the merchant determines an item to substitute for the oversold item, which the online store follows.

23. A computer-implemented method as recited in claim 21, wherein at least a part of the solution depends on a preference specified by the customer of the customer order.

24. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders to identify an item in the orders having been oversold, before delivering items in the orders to the plurality of customers; and
- substituting the oversold item with a substituted item for a customer order based on at least one substitution rule in a storage device, the storage device being accessible by the at least one computing device,
- wherein the method further comprises determining whether to upgrade the oversold item based on size and/or brand.

25. A computer-implemented method as recited in claim 24, wherein said substituting depends on a preference specified by the customer of the customer order.

26. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders collectively to identify an item having been oversold, based on information from the plurality of customer orders, before delivering items in the orders to the plurality of customers; and
- substituting the oversold item with a substituted item for a customer order from a customer based on at least one substitution rule retrieved from a storage device, the storage device being accessible by the at least one computing device.

27. A computer-implemented method as recited in claim 26, wherein the substituting depends on a preference specified by the customer.

28. A computer-implemented method as recited in claim 26 further comprising providing information to the customer regarding an item not being available until a specific date.

29. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders to identify an item in the orders having been oversold, before delivering items in the orders to the plurality of customers;
- substituting the oversold item with a substituted item for a customer order from a customer based on at least one substitution rule retrieved from a storage device, the storage device being accessible by the at least one computing device; and
- charging the customer the lower of the two prices of either the oversold item or the substituted item.

30. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders to identify an item in the orders having been oversold, before delivering items in the orders to the plurality of customers;
- substituting the oversold item with a substituted item for a customer order from a customer based on at least one substitution rule retrieved from a storage device, the storage device being accessible by the at least one computing device; and
- not charging the customer for the substituted item.

31. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders to identify an item in the orders having been oversold, before delivering items in the orders to the plurality of customers; and
- substituting the oversold item with a substituted item for a customer order from a customer based on at least one substitution rule retrieved from a storage device, the storage device being accessible by the at least one computing device,
- wherein another substitution rule restricts substituting all items in another customer order from another customer responsive to the another customer so specifying at the time the another customer places the another customer order.

32. A computer-implemented method for effecting, via a computer network, substitution of at least one ordered item of at least one customer order at an online store, the method comprising:
- receiving, via the computer network, a plurality of customer orders placed by a plurality of customers;
- analyzing, by executing instructions via at least one computing device, the plurality of customer orders to identify an item in the orders having been oversold, before delivering items in the orders to the plurality of customers; and
- substituting the oversold item with a substituted item for a customer order from a customer based on at least one substitution rule retrieved from a storage device, the storage device being accessible by the at least one computing device,
- wherein another substitution rule restricts substituting an item in another customer order from another customer responsive to the another customer so specifying at the time the another customer places the another customer order.

* * * * *